United States Patent
Miyazaki et al.

(10) Patent No.: US 9,850,347 B2
(45) Date of Patent: Dec. 26, 2017

(54) POLYAMIC ACID RESIN COMPOSITION, POLYIMIDE FILM USING SAME, AND METHOD FOR PRODUCING SAID POLYIMIDE FILM

(71) Applicant: TORAY INDUSTRIES, INC., Tokyo (JP)

(72) Inventors: Daichi Miyazaki, Otsu (JP); Masao Tomikawa, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 448 days.

(21) Appl. No.: 14/417,083

(22) PCT Filed: Jul. 30, 2013

(86) PCT No.: PCT/JP2013/070610
§ 371 (c)(1),
(2) Date: Jan. 23, 2015

(87) PCT Pub. No.: WO2014/021319
PCT Pub. Date: Feb. 6, 2014

(65) Prior Publication Data
US 2015/0203631 A1 Jul. 23, 2015

(30) Foreign Application Priority Data
Aug. 1, 2012 (JP) .................................. 2012-170829

(51) Int. Cl.
- C08G 69/32 (2006.01)
- C08G 73/10 (2006.01)
- C03C 17/32 (2006.01)
- C08J 5/18 (2006.01)
- C09D 179/08 (2006.01)

(52) U.S. Cl.
CPC .............. C08G 69/32 (2013.01); C03C 17/32 (2013.01); C08G 73/1042 (2013.01); C08G 73/1053 (2013.01); C08G 73/1067 (2013.01); C08G 73/1071 (2013.01); C08J 5/18 (2013.01); C09D 179/08 (2013.01); Y10T 428/31623 (2015.04)

(58) Field of Classification Search
CPC C08G 69/32; C08G 73/1042; C08G 73/1053; C08G 73/1071; C03C 17/32; C08J 5/18; C09D 179/08
See application file for complete search history.

(56) References Cited

FOREIGN PATENT DOCUMENTS

JP 2001-031764 * 2/2001 ............. C08G 73/10

OTHER PUBLICATIONS

Machine translation of JP 2001-031764. Feb. 2001.*

* cited by examiner

*Primary Examiner* — John Uselding
(74) *Attorney, Agent, or Firm* — Birch, Stewart, Kolasch & Birch, LLP

(57) ABSTRACT

An object is to provide a polyamic acid resin composition that can form a varnish with a low viscosity and serves to produce, through curing, coat film with good mechanical characteristics. Another object is to provide a polyamic acid resin composition in which the acid anhydride terminal group is low in reactivity with diamine and which can give a varnish that does not suffer significant precipitation of diamine. These objects can be met by a polyamic acid resin composition that contains: (a) polyamic acid and (b) a compound as represented by chemical formula (1). (In Chemical formula (1), Z is a di- or higher-valent organic group containing 2 or more carbon atoms, V is a structure as represented by chemical formula (2), and k is an integer of 2 or more.) (In In Chemical formula (2), δ represents oxygen or sulfur atom and W represents an electron-withdrawing group, and $R^{11}$ and $R^{12}$ represent independently a hydrogen atom or a hydrocarbon group containing 1 to 10 carbon atoms.

20 Claims, No Drawings

POLYAMIC ACID RESIN COMPOSITION, POLYIMIDE FILM USING SAME, AND METHOD FOR PRODUCING SAID POLYIMIDE FILM

TECHNICAL FIELD

The present invention relates to a polyamic acid resin composition. More specifically, the invention relates to a polyamic acid resin composition that can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

BACKGROUND ART

With good electrical insulating properties, heat resistance, and mechanical characteristics, polyimides have been used in a variety of fields including semiconductor production. Polyimides generally tend to be insoluble in solvents and thermally infusible and accordingly, difficult to mold or process directly. For film formation, therefore, a solution (hereinafter, referred to as varnish) containing polyamic acid as a precursor of a polyimide is commonly used to form polyimide film through coating and curing steps for conversion. Such a varnish may be a solution as obtained from polymerization of polyamic acid or may be prepared by dissolving polyamic acid in a solvent.

In general, mechanical characteristics (elongation percentage and ultimate stress) of polyimide film can be improved effectively by increasing the degree of polymerization of the polyimide. As the degree of polymerization of polyamic acid increases, however, the viscosity of the polymerization solution increases, often causing troubles in the polymerization process. In addition, it will be difficult to adjust the varnish to a viscosity suitable for coating. The viscosity of a varnish can be adjusted appropriately through control of the polymerization degree of polyamic acid by changing the molar ratio between the acid anhydride group in the acid dianhydride monomer used and the amino group in the multivalent amine compound or diamine compound during the polymerization of polyamic acid. However, polyimides produced from this varnish have the same polymerization degree as the polymerization degree of the original polyamic acid, making it impossible to achieve high mechanical characteristics.

In this regard, Patent documents 1 and 2 have disclosed methods in which diamine is added to a varnish of polyamic acid having an acid anhydride group at a chain end so that the molar ratio between the acid anhydride group in the dianhydride and the amino group in the multivalent amine compound or diamine compound is adjusted to one.

In the methods described in Patent documents 1 and 2, the degree of polymerization of polyamic acid is controlled by changing the molar ratio between the acid dianhydride and the diamine compound to allow the viscosity of the varnish to be adjusted appropriately. In addition, the diamine added reacts with the polyamic acid during curing of coat film, thereby providing a polyimide with a high degree of polymerization.

PRIOR ART DOCUMENTS

Patent Documents

Patent document 1: Japanese Unexamined Patent Publication (Kokai) No. 2001-31764
Patent document 2: Japanese Unexamined Patent Publication (Kokai) No. 2009-109588

SUMMARY OF THE INVENTION

Problems to be Solved by the Invention

However, the problems described below still remain unsolved by the methods proposed in Patent documents 1 and 2. In Patent document 1, it is essential to cap the chain end of the polyamic acid by reacting the acid anhydride terminal group with water or alcohol and it is necessary to take measures to prevent a reaction with the diamine added. In Patent document 2, furthermore, it is necessary to protect the amino group with t-butyloxycarbonyl group and there is the disadvantage that the protected diamine tends to precipitate in the varnish because it contains urea bonds with a high cohesive force.

An object of the present invention is to solve the above problem. Specifically, it aims to provide a polyamic acid resin composition that can form a varnish with a low viscosity and serves to produce, through curing, coat film with good mechanical characteristics. It also aims to provide a polyamic acid resin composition in which the acid anhydride terminal group is low in reactivity with diamine and which can give a varnish that does not suffer significant precipitation of diamine.

Means of Solving the Problems

The present invention provides a polyamic acid resin composition that contains: (a) polyamic acid and (b) a compound as represented by chemical formula (1).

[Chemical formula 1]

$$Z\text{-}(V)_k \qquad (1)$$

(In chemical formula (1), Z is a di- or higher-valent organic group containing 2 or more carbon atoms, V is a structure as represented by chemical formula (2), and k is an integer of 2 or more.)

[Chemical formula 2]

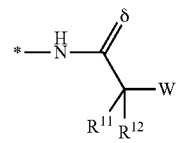

(2)

(In chemical formula (2), δ represents oxygen or sulfur atom and W represents an electron-withdrawing group, and $R^{11}$ and $R^{12}$ represent independently a hydrogen atom or a hydrocarbon group containing 1 to 10 carbon atoms.

Advantageous Effect of the Invention

The invention can provide polyamic acid resin composition that can form a varnish with a low viscosity and serves to produce, through curing, coat film with good mechanical characteristics. It can also provide a polyamic acid resin composition in which the acid anhydride group and the like at the chain end of polyamic acid are low in reactivity with diamine and which can give a varnish that does not suffer significant precipitation of diamine.

DESCRIPTION OF PREFERRED EMBODIMENTS

The present invention provides a polyamic acid resin composition that contains: (a) polyamic acid and (b) a compound as represented by chemical formula (1).

[Chemical formula 3]

(1)

(In chemical formula (1), Z is a di- or higher-valent organic group containing 2 or more carbon atoms, V is a structure as represented by chemical formula (2), and k is an integer of 2 or more.)

[Chemical formula 4]

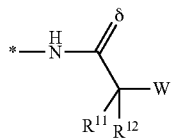
(2)

(In chemical formula (2), δ represents oxygen or sulfur atom and W represents an electron-withdrawing group, and $R^{11}$ and $R^{12}$ represent independently a hydrogen atom or a hydrocarbon group containing 1 to 10 carbon atoms.)

For the polyamic acid resin composition, W in the above chemical formula (2) is preferably represented by any of chemical formulae (3) to (10) given below.

[Chemical formula 5]

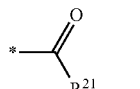
(3)

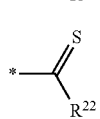
(4)

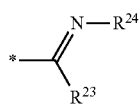
(5)

(6)

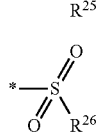
(7)

(8)

(9)

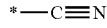
(10)

($R^{21}$ to $R^{28}$ are independently a hydrocarbon group containing 1 to 10 carbon atoms or an organic group containing 1 to 10 carbon atoms and comprising hydrogen and carbon as essential elements and 1 to 10 other atoms of elements selected from the group of boron, oxygen, sulfur, nitrogen, phosphorus, silicon, and halogens.)

For the polyamic acid resin composition, V in the above chemical formula (1) is preferably represented by any of chemical formulae (11) to (13) given below.

[Chemical formula 6]

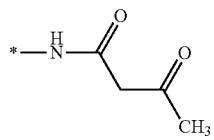
(11)

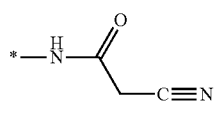
(12)

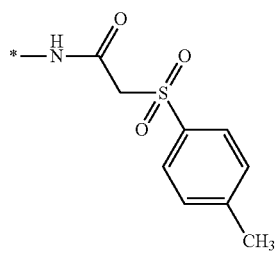
(13)

It is known that the structure given by the above chemical formula (11) can be converted into an isocyanate by heating as represented by chemical formula (21), as reported by, for example, T. Mukaiyama, M. Tokizawa, H. Nohira, and H. Takei, J. Org. Chem., 26, 4381 (1961).

[Chemical formula 7]

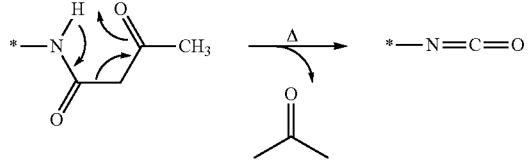
(21)

Furthermore, also in the case where δ in chemical formula (2) is oxygen while W is a group as represented by any of chemical formulae (3) to (10), the structure is expected to be converted into an isocyanate when heated, as shown in chemical formula (22) (when W is a group as represented by any of chemical formulae (3) to (9)) or in chemical formula (23) (when W is a group as represented by chemical formula (10)), in the same way as in chemical formula (21). (Here, chemical formula (22) and chemical formula (23) show reactions that occur when δ is oxygen, but it is expected that thermal conversion into an isothiocyanate also occurs through a similar reaction when δ is sulfur.)

[Chemical formula 8]

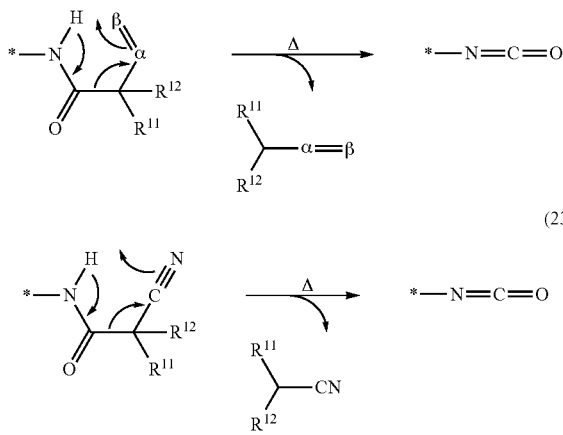

(22)

(23)

(In chemical formula (22), α represents $CR^{21}$ (in chemical formula (3)), $CR^{22}$ (in chemical formula (4)), $CR^{23}$ (in chemical formula (5)), $SR^{25}$ (in chemical formula (6)), $S(O)R^{26}$ (in chemical formula (7)), $PR^{27}R^{28}$ (in chemical formula (8)), or $N^+O^-$ (in chemical formula (9)). β represents O (in chemical formulae (3) and (6) to (9)), S (in chemical formula (4)), or $NR^{24}$ (in chemical formula (5)).)

If an isocyanate is reacted with an acid anhydride group, an imide group will be formed as shown by chemical formula (24). Accordingly, a polyimide with a high polymerization degree can be produced through a reaction with a polyamic acid having an acid anhydride group at, for example, a chain end. Furthermore, a polyimide with a high polymerization degree can also be produced if dimers or trimers are formed through a reaction between isocyanates as shown by chemical formula (25). (It should be noted that reactions as given by chemical formula (24) and chemical formula (25) can occur when the isocyanate is an isothiocyanate.) As a result, it will be possible to obtain polyimide film with improved mechanical characteristics.

[Chemical formula 9]

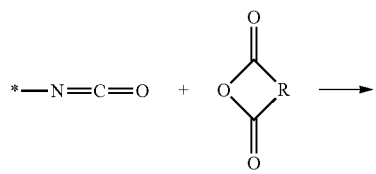

(24)

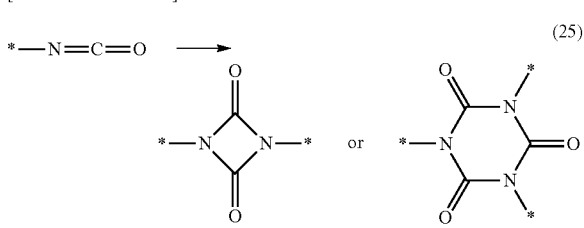

(In chemical formula (24), R denotes a divalent organic group.)

[Chemical formula 10]

*—N=C=O ⟶ (25)

Compound (b), which is represented by chemical formula (1), can be derived from a multivalent amine compound or a diamine compound as described later. In such a case, therefore, Z in chemical formula (1) of compound (b) is a group derived from a residue of either a multivalent amine compound or a diamine compound. Z is preferably a di- or higher-valent hydrocarbon group containing 2 to 80 carbon atoms and may be a di- or higher-valent organic group containing 2 to 80 carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less. In chemical formula (1), k is preferably 2 or 3, and the compound can be derived from a diamine compound when k=2 while it can be derived from a triamine compound when k=3.

Typical multivalent amine compounds and diamine compounds that give compound (b), which is represented by chemical formula (1), are listed below. Examples of multivalent amine compounds and diamine compounds containing an aromatic ring include monocyclic aromatic diamine compounds such as m-phenylene diamine, p-phenylene diamine, and 3,5-diaminobenzoic acid; naphthalene or polycyclic aromatic diamine compounds such as 1,5-naphthalene diamine, 2,6-naphthalene diamine, 9,10-anthracene diamine, and 2,7-diaminofluorene; bis(diaminophenyl) compounds or various derivatives thereof such as 4,4'-diaminobenzanilide, 3,4'-diaminodiphenyl ether, 4,4'-diaminodiphenyl ether, 3-carboxy-4,4'-diaminodiphenyl ether, 3-sulfonic acid-4,4'-diaminodiphenyl ether, 3,4'-diaminodiphenyl methane, 4,4'-diaminodiphenyl methane, 3,4'-diaminodiphenyl sulfone, 4,4'-diaminodiphenyl sulfone, 3,4'-diaminodiphenyl sulfide, 4,4'-diaminodiphenyl sulfide, 4-aminobenzoic acid 4-aminophenyl ester, 9,9-bis(4-aminophenyl)fluoren, and 1,3-bis(4-anilino)tetramethyl disiloxane; 4,4'-diaminobiphenyl or various derivatives thereof such as 4,4'-diaminobiphenyl, 2,2'-dimethyl-4,4'-diaminobiphenyl, 2,2'-diethyl-4,4'-diaminobiphenyl, 3,3'-dimethyl-4,4'-diaminobiphenyl, 3,3'-diethyl-4,4'-diaminobiphenyl, 2,2',3,3'-tetramethyl-4,4'-diaminobiphenyl, 3,3',4,4'-tetramethyl- 4,4'-diaminobiphenyl, and 2,2'-di(trifluoro methyl)-4,4'-diaminobiphenyl; bis(aminophenoxy) compounds such as bis(4-aminophenoxy phenyl)sulfone, bis(3-aminophenoxy phenyl)sulfone, bis(4-aminophenoxy)biphenyl, bis[4-(4-aminophenoxy)phenyl]ether, 2,2-bis[4-(4-aminophenoxy)phenyl]propane, 2,2-bis[4-(4-aminophenoxy)phenyl]hexafluoropropane, 1,4-bis(4-aminophenoxy)benzene, 1,3-bis(3-aminophenoxy)benzene, and 1,3-bis(4-aminophenoxy)benzene; bis(3-amino-4-hydroxyphenyl) compounds such as bis(3-amino-4-hydroxyphenyl) hexafluoropropane, bis(3-amino-4-hydroxyphenyl)sulfone, bis(3-amino-4-hydroxyphenyl)propane, bis(3-amino-4-hydroxyphenyl)methylene, bis(3-amino-4-hydroxyphenyl) ether, bis(3-amino-4-hydroxy)biphenyl, and 9,9-bis(3-amino-4-hydroxyphenyl)fluorene; bis(aminobenzoyl) compounds such as 2,2'-bis[N-(3-aminobenzoyl)-3-amino-4-hydroxyphenyl]hexafluoropropane, 2,2'-bis[N-(4-aminobenzoyl)-3-amino-4-hydroxyphenyl]hexafluoropropane, 2,2'-bis[N-(3-aminobenzoyl)-3-amino-4-hydroxyphenyl]propane, 2,2'-bis[N-(4-aminobenzoyl)-3-amino-4-hydroxyphenyl]propane, bis[N-(3-aminobenzoyl)-3-amino-4-hydroxyphenyl]sulfone, bis[N-(4-aminobenzoyl)-3-amino-4-hydroxyphenyl]sulfone, 9,9-bis[N-(3-aminobenzoyl)-3-amino-4-hydroxyphenyl]fluorene, 9,9-bis[N-(4-aminobenzoyl)-3-amino-4-hydroxyphenyl]fluorene, N,N'-bis(3-aminobenzoyl)-2,5-diamino-1,4-dihydroxy benzene, N,N'-bis(4-aminobenzoyl)-2,5-diamino-1,4-dihydroxy benzene, N,N'-bis(3-aminobenzoyl)-4,4'-diamino-3,3-dihydroxy biphenyl, N,N'-bis(4-aminobenzoyl)-4,4'-diamino-3,3-dihydroxy biphenyl, N,N'-bis(3-aminobenzoyl)-3,3-diamino-4,4-dihydroxy biphenyl, and N,N'-bis(4-aminobenzoyl)-3,3'-diamino-4,4-dihydroxy biphenyl; heterocyclic containing diamine compounds such as 2-(4-aminophenyl)-5-aminobenzoxazole, 2-(3-aminophenyl)-5-aminobenzoxazole, 2-(4-aminophenyl)-6-aminobenzoxazole, 2-(3-aminophenyl)-6-aminobenzoxazole, 1,4-bis(5-amino-2-benzoxazolyl)benzene, 1,4-bis(6-amino-2-benzoxazolyl)benzene, 1,3-bis(5-amino-2-benzoxazolyl)benzene, 1,3-bis(6-amino-2-benzoxazolyl)benzene, 2,6-bis(4-aminophenyl)benzobisoxazole, 2,6-bis(3-aminophenyl)benzobisoxazole, 2,2'-bis[(3-aminophenyl)-5-benzoxazolyl]hexafluoropropane, 2,2'-bis[(4-aminophenyl)-5-benzoxazolyl]hexafluoropropane, bis[(3-aminophenyl)-5-benzoxazolyl], bis[(4-aminophenyl)-5-benzoxazolyl], bis[(3-aminophenyl)-6-benzoxazolyl], and bis[(4-aminophenyl)-6-benzoxazolyl]; aromatic triamine compounds such as 1,3,5-triamino benzene, tris(3-aminophenyl)methane, tris(4-aminophenyl) methane, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene, 1,3,5-tris(4-aminophenoxy)triazine, melamine, 2,4,6-triamino pyrimidine, and 3,5-bis(4-aminophenyl)aniline; aromatic tetraamine compounds such as 1,2,4,5-tetraaminobenzene, 3,3',4,4'-tetraaminobiphenyl, 3,3',4,4'-tetraaminodiphenyl sulfone, 3,3',4,4'-tetraaminodiphenyl sulfide, 2,3,6,7-tetraaminonaphthalene, and 1,2,5,6-tetraaminonaphthalene; and compounds produced from these multivalent amine compounds or diamine compounds by replacing one or more of the hydrogen atoms bonded to their aromatic rings with hydrocarbons or halogen atoms.

Examples of aliphatic multivalent amine compounds include aliphatic diamine compounds such as ethylene diamine, propylene diamine, butane diamine, pentane diamine, hexane diamine, octane diamine, nonane diamine, decane diamine, undecane diamine, dodecane diamine, tetramethyl hexane diamine, 1,12-(4,9-dioxa)dodecane diamine, 1,8-(3,6-dioxa)octane diamine, and 1,3-bis(3-aminopropyl)tetramethyl disiloxane; alicyclic diamine compounds such as cyclohexane diamine, 4,4'-methylene bis(cyclohexyl amine), and isophorone diamine; the polyoxyethylene amine and polyoxypropylene amine products under the trade name of Jeffamine (manufactured by Huntsman Corporation) and copolymer compounds thereof.

Polyamic acid (a), which is contained in the polyamic acid resin composition according to the present invention, preferably contains a structure as represented by chemical formula (14) or (15). If the polyamic acid contains a structure as represented by chemical formula (14), it reacts, when cured, with the compound represented by chemical formula (1) to form imide bonds as described above, thereby producing a polyimide with a high degree of polymerization. A structure as represented by chemical formula (15), on the other hand, is converted into an acid anhydride group when cured, and therefore, it reacts with the compound represented by chemical formula (1) to form imide bonds, thereby producing a polyimide with a high degree of polymerization.

[Chemical formula 11]

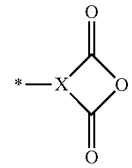

(14)

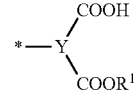

(15)

(In chemical formula (14), X denotes a tri- or higher-valent organic group containing 2 or more carbon atoms. In chemical formula (15), Y denotes a tri- or higher-valent organic group containing 2 or more carbon atoms, and $R^1$ denotes a hydrogen atom, a hydrocarbon group containing 1 to 10 carbon atoms, or an alkylsilyl group containing 1 to 10 carbon atoms.)

X and Y are preferably a tetravalent hydrocarbon group containing 2 to 80 carbon atoms and may be a tetravalent organic group containing 2 to 80 carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less.

Furthermore, the polyamic acid preferably has a structure as represented by chemical formula (16) or (17). Specifically, it is preferable that X in chemical formula (14) and Y in chemical formula (15) be a residue of tetracarboxylic acid as represented by $X^1$ and $Y^1$, respectively, and that the residue of tetracarboxylic acid is located at a chain end of the polyamic acid.

[Chemical formula 12]

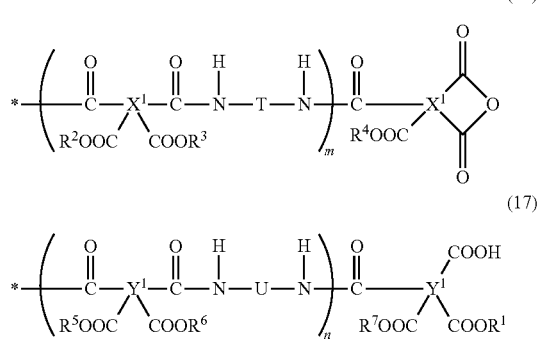

(In chemical formula (16), $X^1$ denotes a residue of tetracarboxylic acid containing 2 or more carbon atoms, T denotes a residue of diamine containing 2 or more carbon atoms, and m a positive integer. (In chemical formula (17), $Y^1$ denotes a residue of tetracarboxylic acid containing 2 or more carbon atoms, U denotes a residue of diamine containing 2 or more carbon atoms, n denotes a positive integer, and $R^1$ to $R^7$ independently denote a hydrogen atom, a hydrocarbon group containing 1 to 10 carbon atoms, or an alkylsilyl group containing 1 to 10 carbon atoms.)

Examples of tetracarboxylic acid that can give X or Y are as follows. Examples of such aromatic tetracarboxylic acid include monocyclic aromatic tetracarboxylic acid compounds such as pyromellitic acid and 2,3,5,6-pyridine tetracarboxylic acid; various isomers of biphenyl tetracarboxylic acid such as 3,3',4,4'-biphenyl tetracarboxylic acid, 2,3,3',4'-biphenyl tetracarboxylic acid, 2,2',3,3'-biphenyl tetracarboxylic acid, 3,3',4,4'-benzophenone tetracarboxylic acid, and 2,2',3,3'-benzophenone tetracarboxylic acid; bis(dicarboxyphenyl) compounds such as 2,2-bis(3,4-dicarboxyphenyl)hexafluoropropane, 2,2-bis(2,3-dicarboxyphenyl)hexafluoropropane, 2,2-bis(3,4-dicarboxyphenyl)propane, 2,2-bis(2,3-dicarboxyphenyl)propane, 1,1-bis(3,4-dicarboxyphenyl)ethane, 1,1-bis(2,3-dicarboxyphenyl)ethane, bis(3,4-dicarboxyphenyl)methane, bis(2,3-dicarboxyphenyl)methane, bis(3,4-dicarboxyphenyl)sulfone, and bis(3,4-dicarboxyphenyl)ether; bis(dicarboxyphenoxy phenyl) compounds such as 2,2-bis[4-(3,4-dicarboxyphenoxy)phenyl]hexafluoropropane, 2,2-bis[4-(2,3-dicarboxyphenoxy)phenyl]hexafluoropropane, 2,2-bis[4-(3,4-dicarboxyphenoxy)phenyl]propane, 2,2-bis[4-(2,3-dicarboxyphenoxy)phenyl]propane, 2,2-bis[4-(3,4-dicarboxyphenoxy)phenyl]sulfone, and 2,2-bis[4-(3,4-dicarboxyphenoxy)phenyl]ether; various isomers of naphthalene or polycyclic aromatic tetracarboxylic acid such as 1,2,5,6-naphthalene tetracarboxylic acid, 1,4,5,8-naphthalene tetracarboxylic acid, 2,3,6,7-naphthalene tetracarboxylic acid, 2,3,6,7-naphthalene tetracarboxylic acid, and 3,4,9,10-perylene tetracarboxylic acid; and bis(trimellitic acid monoester acid anhydride) compounds such as p-phenylene bis(trimellitic acid monoester acid anhydride), p-biphenylene bis(trimellitic acid monoester acid anhydride), ethylene bis(trimellitic acid monoester acid anhydride), and bisphenol A bis(trimellitic acid monoester acid anhydride). Examples of such aliphatic tetracarboxylic acid include chain aliphatic tetracarboxylic acid compounds such as butane tetracarboxylic acid; and alicyclic tetracarboxylic acid compounds such as cyclobutane tetracarboxylic acid, 1,2,3,4-cyclopentane tetracarboxylic acid, 1,2,4,5-cyclohexane tetracarboxylic acid, bicyclo[2.2.1.]heptane tetracarboxylic acid, bicyclo[3.3.1.]tetracarboxylic acid, bicyclo[3.1.1.]hept-2-ene tetracarboxylic acid, bicyclo[2.2.2.]octane tetracarboxylic acid, and adamantane tetracarboxylic acid.

These acids may be used as they are or in the form of an acid anhydride, active ester, or active amide. Two or more thereof may be used in combination. For uses where heat resistance is required, it is preferable that the aromatic tetracarboxylic acids account for 50 mol % or more of the total quantity of tetracarboxylic acids.

The use of a tetracarboxylic acid containing a silicon atom such as dimethylsilane diphthalic acid and 1,3-bis(phthalic acid)tetramethyl disiloxane can serve to increase the adhesion to a support and the resistance to oxygen plasma used for cleaning and the like and to UV ozone processing. It is preferable that these tetracarboxylic acids containing a silicon atom account for 1 to 30 mol % of the total quantity of tetracarboxylic acids.

For the tetracarboxylic acids given above as examples, one or more of the hydrogen atoms contained in a tetracarboxylic acid residue may be replaced with a hydrocarbon group containing 1 to 10 carbon atoms such as methyl group and ethyl group; a fluoroalkyl group containing 1 to 10 carbon atoms such as trifluoromethyl group; or other groups such as F, Cl, Br, and I. Furthermore, if they are replaced with an acidic group such as OH, COOH, $SO_3H$, $CONH_2$, and $SO_2NH_2$, it is preferable in the case of the use as a photosensitive resin composition as described later because they serve to improve the solubility of the resin in an aqueous alkali solution.

T and U are preferably a divalent hydrocarbon group containing 2 to 80 carbon atoms and may be a divalent organic group containing 2 to 80 carbon atoms and including hydrogen and carbon as essential elements and one or more other atoms of elements selected from the group of boron, oxygen, sulfur, nitrogen, phosphorus, silicon, and halogens. For each of boron, oxygen, sulfur, nitrogen, phosphorus, silicon, and halogens, the number of atoms included is preferably in the range of 20 or less, more preferably in the range of 10 or less.

Examples of diamine compounds that give T or U include those diamine compounds which are included in the above-mentioned list of multivalent amine compounds and diamine compounds that give compound (b), which is represented by chemical formula (1) (hereinafter occasionally referred to as diamine compounds that give compound (b), which is represented by chemical formula (1)).

These diamines may be used in their original form or in the form of a corresponding trimethylsilylated diamine. Two or more thereof may be used in combination. For uses where heat resistance is required, it is preferable that the aromatic diamine compounds account for 50 mol % or more of the total diamine compounds.

The use of a silicon-containing diamine, such as 1,3-bis(3-aminopropyl)tetramethyl disiloxane and 1,3-bis(4-anilino)tetramethyl disiloxane, as diamine component can serve to increase the contact with the support and the resistance to oxygen plasma used for cleaning and the like and to UV ozone processing. It is preferable that these silicon-containing diamine compounds account for 1 to 30 mol % of the total quantity of diamine compounds.

In addition to those listed above, the diamine compounds that give T or U also include the diamine compounds that give compound (b), which is represented by chemical formula (1), in which one or more of the hydrogen atoms contained are replaced with a hydrocarbon group containing 1 to 10 carbon atoms such as methyl group and ethyl group, a fluoroalkyl group containing 1 to 10 carbon atoms such as trifluoromethyl group, or others such as F, Cl, Br, and I. Furthermore, if they are replaced with an acidic group such as OH, COOH, $SO_3H$, $CONH_2$, and $SO_2NH_2$, it is preferable in the case of the use as a photosensitive resin composition as described later because they serve to improve the solubility of the resin in an aqueous alkali solution.

For the polyamic acid compounds that contain a structure as represented by chemical formula (16) or chemical formula (17), the number of repetitions of the polyamic acid unit is preferably 5 or more, more preferably 10 or more. In addition, it is preferably 500 or less, more preferably 200 or less. If it is in this range, the molecular weight can be controlled in a preferable range. For m in chemical formula (16) and n in chemical formula (17), it is only necessary to meet the requirement for the preferable number of repetitions of the polyamic acid units according to the present invention. Accordingly, m and n are preferably 5 or more, more preferably 10 or more. In addition, it is preferably 500 or less, more preferably 200 or less.

After adding a solvent, the polyamic acid resin composition according to the present invention can be used as varnish. As described later, a film containing polyamic acid can be produced by spreading such a varnish over the surface of various supports. A polyimide film can be produced by imidizing the polyamic acid in this film. Useful solvents include aprotic polar solvents such as N-methyl-2-pyrolidone, γ-butyrolactone, N,N-dimethyl formamide, N,N-dimethyl acetamide, and dimethyl sulfoxide; ethers such as tetrahydrofuran, dioxane, propylene glycol monomethyl ether, propylene glycol monoethyl ether, diethylene glycol monomethyl ether, diethylene glycol monoethyl ether, diethylene glycol ethyl methyl ether, and diethylene glycol dimethyl ether; ketones such as acetone, methyl ethyl ketone, diisobutyl ketone, diacetone alcohol, and cyclohexanone; esters such as ethyl acetate, propylene glycol monomethyl ether acetate, and ethyl lactate; and aromatic hydrocarbons such as toluene, xylene, which may be used singly or in combination as a mixture of two or more thereof.

A varnish with a low viscosity can be obtained even if it contains the polyamic acid resin composition according to the present invention at a high concentration. Accordingly, there are no specific limitations on the preferable content of the solvent, but it is preferably 50 parts by mass or more, more preferably 100 parts by mass or more, and preferably 2,000 parts by mass or less, more preferably 1,500 parts by mass or less, per 100 parts by mass of polyamic acid (a). If it is in the range where these requirements are met, a viscosity suitable for coating can be ensured to allow easy production of a coat with an appropriately controlled thickness. For the present invention, a substrate laminated with a film containing a polyamic acid resin composition produced by coating a substrate with a varnish containing a polyamic acid resin composition and drying to remove the solvent is referred to as a film-coated substrate.

The polyamic acid according to the present invention has a polystyrene-based weight average molecular weight of preferably 100,000 or less, more preferably 80,000 or less, and still more preferably 50,000 or less, as determined by gel permeation chromatography. If it is in this range, an increase in viscosity of a varnish can be depressed more effectively even if the varnish has a high concentration. Furthermore, the weight average molecular weight is preferably 2,000 or more, more preferably 3,000 or more, and still more preferably 5,000 or more. If the weight average molecular weight is 2,000 or more, it is possible to avoid resulting in a varnish with an excessively low viscosity and ensure good coatability.

The polyamic acid resin composition according to the present invention can be converted into a photosensitive resin composition by adding a photoacid generating agent. The inclusion of a photoacid generating agent works to produce an acid in the irradiated portion so that the irradiated portion increases in solubility in an aqueous alkali solution, allowing a positive type relief pattern to be formed after dissolution of the irradiated portion. The inclusion of an epoxy compound or a thermal crosslinking agent as described later along with the photoacid generating agent allows the acid formed in the irradiated portion to serve for promotion of the crosslinking reaction of the epoxy compound and the thermal crosslinking agent, leading to the formation of a negative type relief pattern as a result of insolubilization of the irradiated portion.

Examples of such a photoacid generating agent include quinone diazide compounds, sulfonium salts, phosphonium salts, diazonium salts, and iodonium salts. Two or more thereof may be added to obtain a photosensitive resin composition with a high sensitivity.

Examples of such quinone diazide compounds include polyhydroxy compounds bonded to sulfonic acid of quinone diazide through ester linkage, polyamino compounds bonded to sulfonic acid of quinone diazide through sulfonamide linkage, and polyhydroxypolyaminno compounds bonded to sulfonic acid of quinone diazide through ester linkage and/or sulfonamide linkage. It is preferable that 50 mol % or more of the functional groups in the polyhydroxy compounds and polyamino compounds be replaced with quinone diazide.

For the quinone diazide used for the present invention, both 5-naphthoquinone diazide sulfonyl group and 4-naphthoquinone diazide sulfonyl group are preferred. A 4-naphthoquinone diazide sulfonyl ester compound absorbs light in the i-line range of mercury lamps, and therefore, it is suitable for i-line light exposure. A 5-naphthoquinone diazide sulfonyl ester compound absorbs light in a region including the g-line of mercury lamps, and therefore, it is suitable for g-line light exposure. For the present invention, it is preferable to adopt either a 4-naphthoquinone diazide sulfonyl ester compound or a 5-naphthoquinone diazide sulfonyl ester compound depending on the wavelength of the light used for exposure. Furthermore, the agent may contain a naphthoquinone diazide sulfonyl ester compound having both a 4-naphthoquinone diazide sulfonyl group and a 5-naphthoquinone diazide sulfonyl group in one molecule, or the resin composition to be used may contain both a 4-naphthoquinone diazide sulfonyl ester compound and a 5-naphthoquinone diazide sulfonyl ester compound.

Of the examples of photoacid generating agents, the sulfonium salt, phosphonium salt, and diazonium salt are preferable because they can stabilize moderately the acid component produced by light exposure. The sulfonium salt is particularly preferable. In addition, a sensitization agent and the like may also be contained as needed.

For the present invention, the content of the photoacid generating agent is preferably 0.01 to 50 parts by mass per 100 parts by mass of polyamic acid (a) from the viewpoint of increasing the sensitivity. Of these, the quinone diazide compound preferably accounts for 3 to 40 parts by mass. The total content of the sulfonium salt, phosphonium salt, and diazonium salt is preferably 0.5 to 20 parts by mass.

The photosensitive resin composition according to the present invention may contain a thermal crosslinking agent as shown by chemical formula (31) given below or a thermal crosslinking agent having a structure as shown by chemical formula (32) given below (hereinafter, both are referred to as thermal crosslinking agent). These thermal crosslinking agents can crosslink between compounds that fall under polyamic acid (a) or with other additive components, thereby serving to produce polyimide film with enhanced chemical resistance and hardness.

[Chemical formula 13]

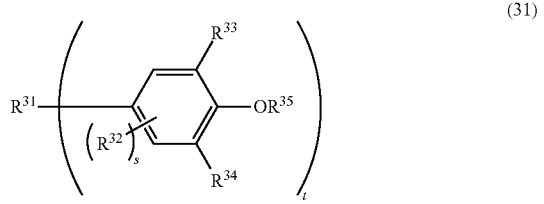

(31)

(In the above chemical formula (31), $R^{31}$ denotes a di- to tetra-valent linking group. $R^{32}$ denotes a monovalent hydrocarbon group containing 1 to 20 carbon atoms, Cl, Br, I, or F. $R^{33}$ and $R^{34}$ independently denote $CH_2OR^{36}$ (where $R^{36}$ is a hydrogen atom or a monovalent hydrocarbon containing 1 to 6 carbon atoms). $R^{35}$ is a hydrogen atom, methyl group, or ethyl group. Furthermore, s is an integer of 0 to 2, and t is an integer of 2 to 4. If a plurality of $R^{32}$s exist, they may be identical to or different from each other. If a plurality of $R^{33}$s and $R^{34}$s exist, they may be identical to or different from each other. If a plurality of $R^{35}$s exist, they may be identical to or different from each other. Examples of the linking group $R^{31}$ are listed below.)

[Chemical formula 14]

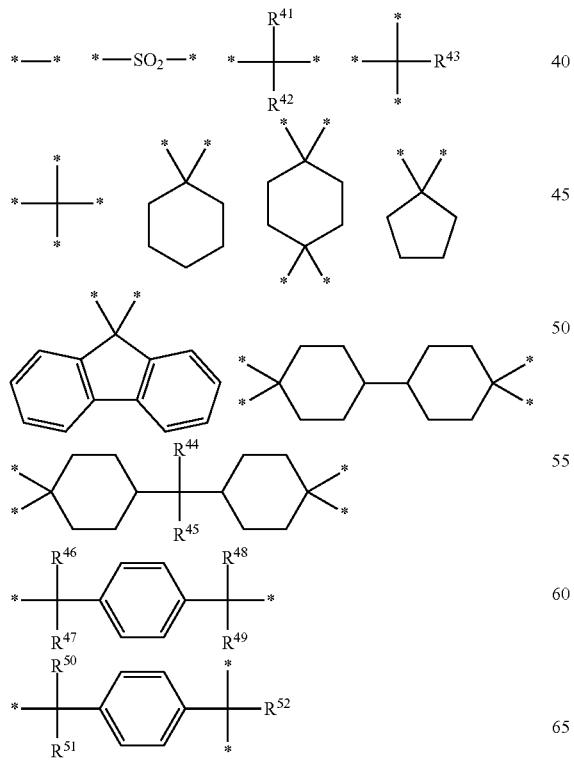

-continued

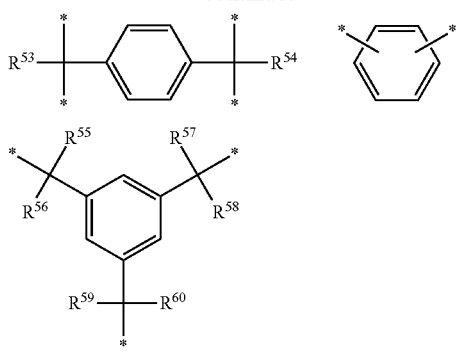

(In the above chemical formula, $R^{41}$ to $R^{60}$ denote a hydrogen atom or a monovalent hydrocarbon group containing 1 to 20 carbon atoms in which one or more of the hydrogen atoms may be replaced with Cl, Br, I, or F.)

[Chemical formula 15]

$*-N(CH_2OR^{37})_u(H)_v$ (32)

(In the above chemical formula (32), $R^{37}$ denotes a hydrogen atom or a monovalent hydrocarbon containing carbon 1 to 6 atoms. Further, u denotes 1 or 2 and v denotes 0 or 1. Here, u+v is equal to 1 or 2)).

In the above formula (31), $R^{33}$ and $R^{34}$ denote $CH_2OR^{36}$ (where $R^{36}$ is a hydrogen atom or a monovalent hydrocarbon containing 1 to 6 carbon atoms) which is a thermally crosslinkable group. $R^{36}$ is preferably a monovalent hydrocarbon group containing 1 to 4 carbon atoms, more preferably a methyl group or ethyl group, to allow the thermal crosslinking agent of chemical formula (31) to maintain a moderate degree of reactivity and high storage stability.

Preferable examples of thermal crosslinking agents containing a structure as represented by chemical formula (31) are listed below.

[Chemical formula 16]

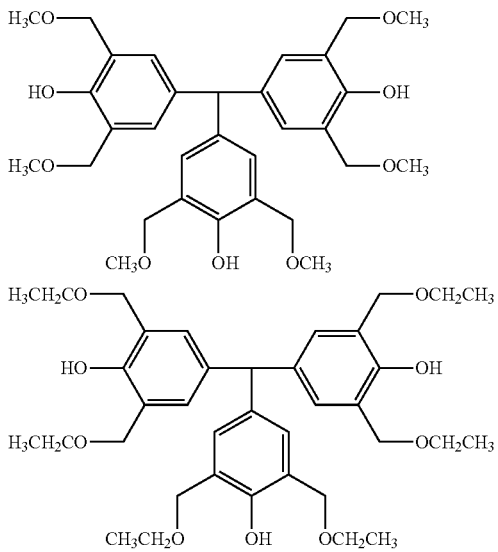

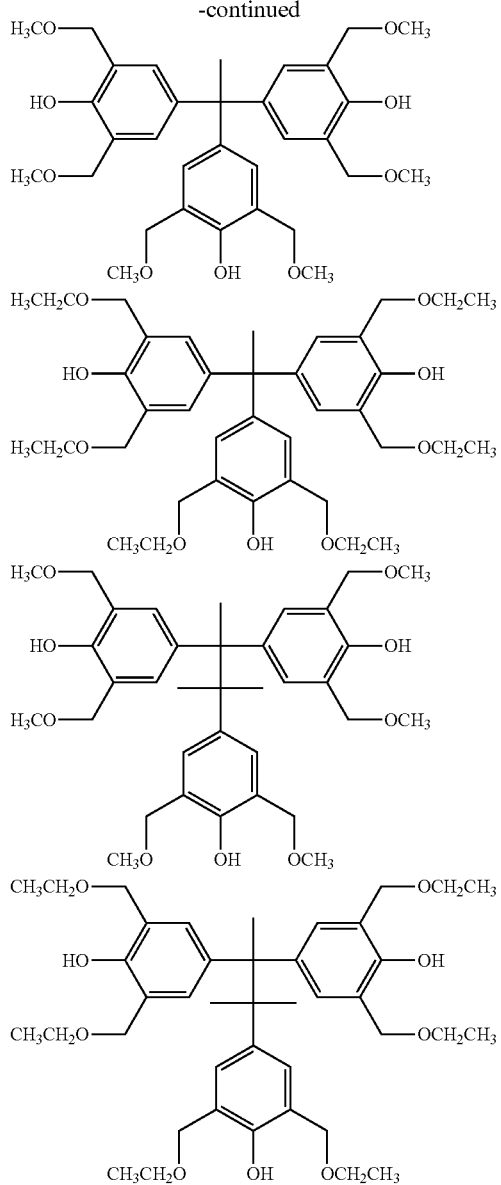

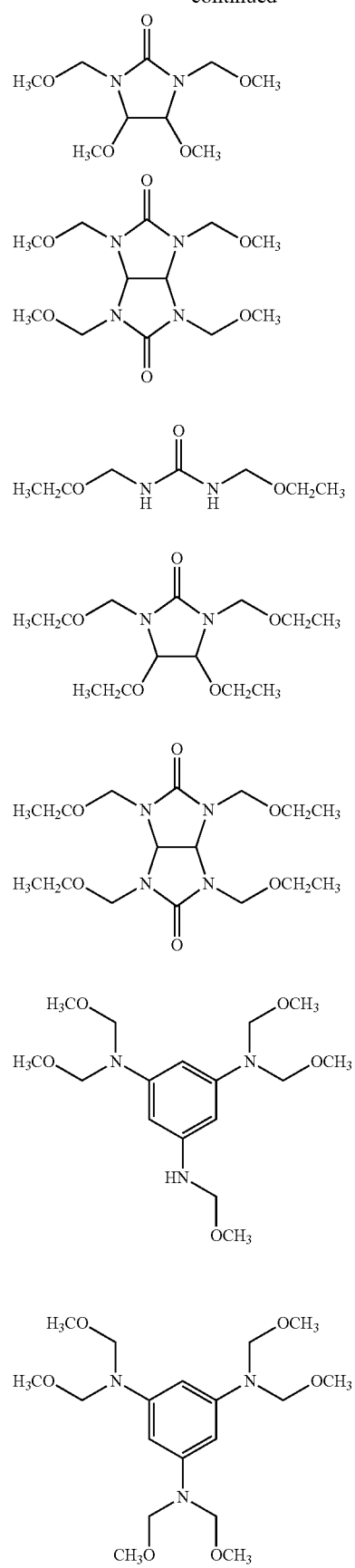

In chemical formula (32), $R^{37}$ denotes a hydrogen atom or a monovalent hydrocarbon group containing 1 to 6 carbon atoms, preferably a monovalent hydrocarbon group containing 1 to 4 carbon atoms. Furthermore, from the viewpoint of stability of the compound and storage stability of the photosensitive resin composition, $R^{37}$ is preferably a methyl group or ethyl group and the compound preferably contains 8 or less ($CH_2OR^{37}$) groups.

Preferable examples of thermal crosslinking agents containing a group as represented by chemical formula (32) are listed below.

[Chemical formula 17]

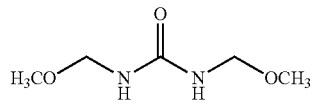

-continued

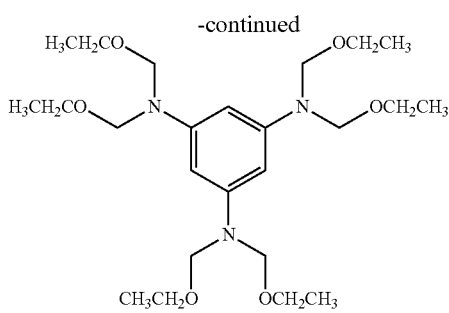

The content of the thermal crosslinking agent is preferably 10 parts by mass or more and 100 parts by mass or less per 100 parts by mass of polyamic acid (a). If the content of the thermal crosslinking agent is 10 parts by mass or more and 100 parts by mass or less, a polyimide film with high strength and a photosensitive resin composition with high storage stability will be obtained.

The polyamic acid resin composition according to the present invention may further contain a thermal acid-forming agent. A thermal acid-forming agent works to generate an acid when heated after development as described later, promote the crosslinking reaction between polyamic acid (a) and the thermal crosslinking agent, and also promote the cyclization of imide rings in polyamic acid (a). This serves to provide polyimide film with an improved chemical resistance and a reduced film loss. The acid generated by the thermal acid-forming agent is preferably a strong acid, which is preferably an aryl sulfonic acid such as p-toluene sulfonic acid and benzene sulfonic acid or an alkyl sulfonic acid such as methane sulfonic acid, ethane sulfonic acid, and butane sulfonic acid. For the present invention, the thermal acid-forming agent is preferably an aliphatic sulfonic acid compound as represented by chemical formula (33) or (34), and two or more of such compounds may be contained.

[Chemical formula 18]

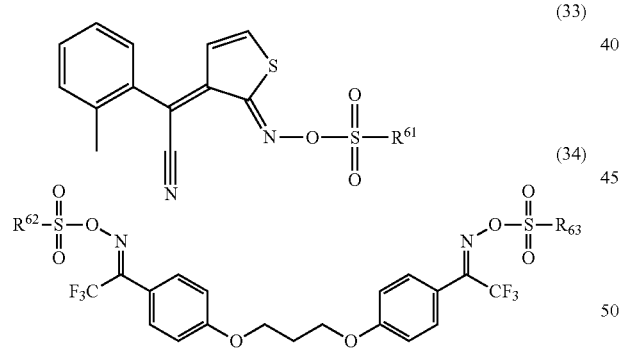

In the chemical formulae (33) and (34), $R^{61}$ to $R^{63}$ may be identical to or different from each other and may have an organic group containing 1 to 20 carbon atoms, which is preferably a hydrocarbon group containing 1 to 20 carbon atoms. They may be an organic group containing 1 to 20 carbon atoms and including hydrogen and carbon as essential elements and one or more atoms of elements selected from the group of boron, oxygen, sulfur, nitrogen, phosphorus, silicon, and halogens.

Specific examples of such compounds represented by chemical formula (33) are listed below.

[Chemical Formula 19]

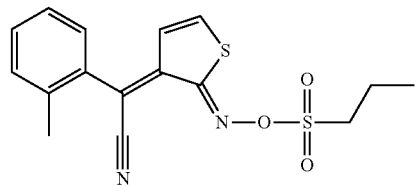

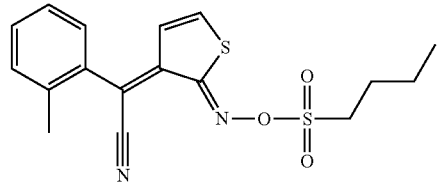

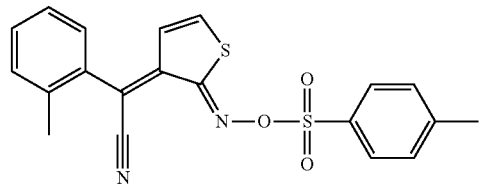

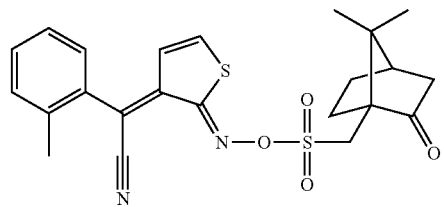

Specific examples of such compounds represented by chemical formula (34) are listed below.

[Chemical formula 20]

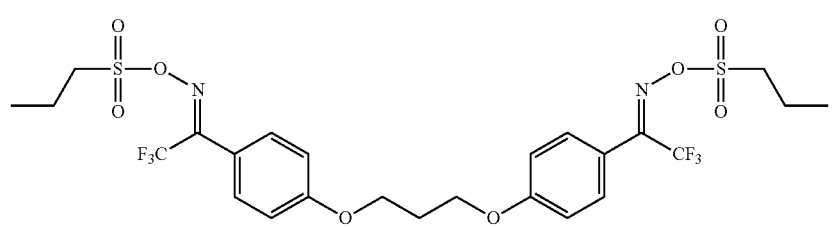

The content of the thermal acid-forming agent is preferably 0.5 part by mass or more and 10 parts by mass or less per 100 parts by mass of polyamic acid (a) from the viewpoint of promoting the crosslinking reaction.

It may contain a compound having a phenolic hydroxyl group as required to help the alkaline developer in developing the photosensitive resin composition. Examples of compounds with a phenolic hydroxyl group include, for example, the products available from Honshu Chemical Industry Co., Ltd., under the following trade names: Bis-Z, BisOC-Z, BisOPP-Z, BisP-CP, Bis26X-Z, BisOTBP-Z, BisOCHP-Z, BisOCR-CP, BisP-MZ, BisP-EZ, Bis26X-CP, BisP-PZ, BisP-IPZ, BisCR-IPZ, BisOCP-IPZ, BisOIPP-CP, Bis26X-IPZ, BisOTBP-CP, TekP-4HBPA (tetrakis P-DO-BPA), TrisP-HAP, TrisP-PA, TrisP-PHBA, TrisP-SA, TrisOCR-PA, BisOFP-Z, BisRS-2P, BisPG-26X, BisRS-3P, BisOC-OCHP, BisPC-OCHP, Bis25X-OCHP, Bis26X-OCHP, BisOCHP-OC, Bis236T-OCHP, methylene tris-FR-CR, BisRS-26X, and BisRS-OCHP; the products available from Asahi Organic Chemicals Industry Co., Ltd., under the following trade names: BIR-OC, BIP-PC, BIR-PC, BIR-PTBP, BIR-PCHP, BIP-BIOC-F, 4PC, BIR-BIPC-F, and TEP-BIP-A; and others including 1,4-dihydroxy naphthalene, 1,5-dihydroxy naphthalene, 1,6-dihydroxy naphthalene, 1,7-dihydroxy naphthalene, 2,3-dihydroxy naphthalene, 2,6-dihydroxy naphthalene, 2,7-dihydroxy naphthalene, 2,4-dihydroxy quinoline, 2,6-dihydroxy quinoline, 2,3-dihydroxy quinoxaline, anthracene-1,2,10-triol, anthracene-1,8,9-triol, and 8-quinolinol. If such a compound with a phenolic hydroxyl group is contained, the resulting photosensitive resin composition will be scarcely dissolved in an alkaline developer before exposure, but will be easily dissolved in an alkaline developer after exposure, leading to a decreased film loss during development and ensuring rapid and easy development. Accordingly, the sensitivity will improve easily.

Such a compound with a phenolic hydroxyl group preferably accounts for 3 parts by mass or more and 40 parts by mass or less per 100 parts by mass of polyamic acid (a).

The photosensitive resin composition according to the present invention may contain a contact improving agent. Examples of such contact improving agents include silane coupling agents such as vinyl trimethoxysilane, vinyl triethoxysilane, epoxy cyclohexyl ethyl trimethoxysilane, 3-glycidoxy propyl trimethoxysilane, 3-glycidoxy propyl triethoxysilane, p-styryl trimethoxysilane, 3-aminopropyl trimethoxysilane, 3-aminopropyl triethoxysilane, and N-phenyl-3-aminopropyl trimethoxysilane, as well as titanium chelate agents and aluminum chelate agents. There are others including alkoxysilane-containing aromatic amine compounds and alkoxysilane-containing aromatic amide compounds as listed below.

[Chemical formula 21]

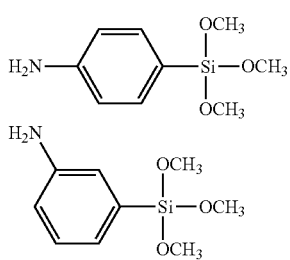

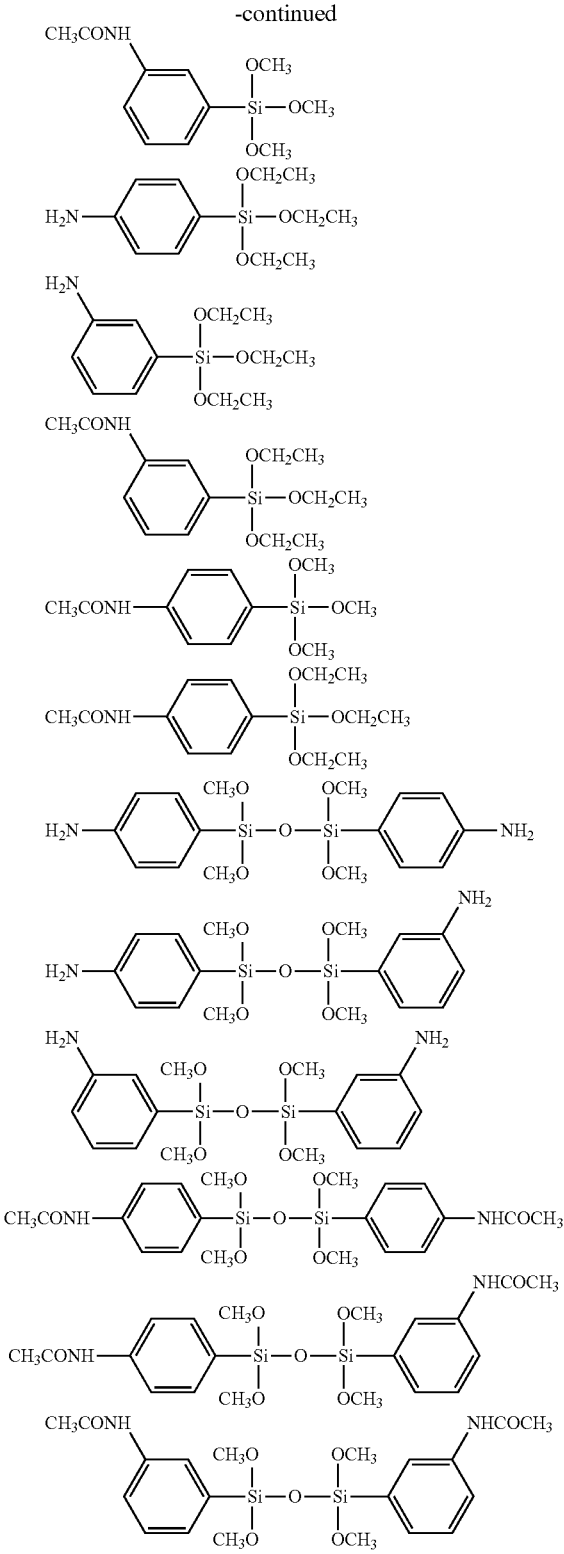

Besides, compounds produced through a reaction between an aromatic amine compound and an alkoxy-containing silicon compound can also be used. Such compounds include, for example, those produced by reacting an aromatic amine compound with an alkoxysilane compound having a group reactive with an amino group such as epoxy group and chloromethyl group. Two or more of the above contact improving agents may be contained. If these contact improving agents are contained, the photosensitive resin film can come in stronger contact with the substrate material such as silicon wafer, ITO, $SiO_2$, and nitride silicon during the development step. Besides, improved contact between the polyimide film and the substrate material can increase the resistance to oxygen plasma and UV ozone treatment performed for cleaning. The content of the contact improving agent is preferably 0.01 to 10 parts by mass per 100 parts by mass of polyamic acid (a).

The polyamic acid resin composition according to the present invention may contain inorganic particles with the aim of improving the heat resistance. Materials of inorganic particles used for this aim include metals such as platinum, gold, palladium, silver, copper, nickel, zinc, aluminum, iron, cobalt, rhodium, ruthenium, tin, lead, bismuth, and tungsten and metal oxides such as silicon oxide (silica), titanium oxide, aluminum oxide, zinc oxide, tin oxide, tungsten oxide, zirconium oxide, calcium carbonate, and barium sulfate. There are no specific limitations on the shape of these inorganic particles, and they may be spherical, elliptic, flattened, rod-like, or fibrous. To prevent an increase in the surface roughness of the polyimide film produced from a polyamic acid resin composition containing these inorganic particles, the average particle diameter of the inorganic particles is preferably 1 nm or more and 100 nm or less, more preferably 1 nm or more and 50 nm or less, and still more preferably 1 nm or more and 30 nm or less.

The content of the inorganic particles is preferably 3 parts by mass or more, more preferably 5 parts by mass or more, and still more preferably 10 parts by mass or more, and preferably 100 parts by mass or less, more preferably 80 parts by mass or less, and still more preferably 50 parts by mass or less, per 100 parts by mass of polyamic acid (a). The heat resistance will be sufficiently high if the content of the inorganic particles is 3 parts by mass or more, and the resulting cured film will have sufficiently high toughness if it is 100 parts by mass or less.

The polyamic acid resin composition according to the present invention may contain a surface active agent in order to improve the coatability. Useful surface active agents include fluorochemical surface active agents such as Fluorad (registered trademark) manufactured by Sumitomo 3M, Megafac (registered trademark) manufactured by DIC, Surflon (registered trademark) manufactured by Asahi Glass Co., Ltd.; organic siloxane surface active agents such as KP341 manufactured by Shin-Etsu Chemical Co., Ltd. DBE manufactured by Chisso Corporation, Polyflow (registered trademark) and Glanol (registered trademark) manufactured by Kyoeisha Chemical Co., Ltd., and BYK manufactured by BYK-Chemie; and acrylic polymer surface active agents such as Polyflow manufactured by Kyoeisha Chemical Co., Ltd. The content of these surface active agent is preferably 0.01 to 10 parts by mass per 100 parts by mass of polyamic acid (a).

Described below is the production method for the polyamic acid resin composition according to the present invention.

Polyamic acid (a) can be polymerized by a known method. Specifically, it can be produced by polymerizing an acid component such as tetracarboxylic acid and a corresponding acid dianhydride, active ester, and active amide with a diamine component such as diamine and a corresponding trimethylsilylated diamine in a reaction solvent. Furthermore, a polyamic acid compound having a structure as represented by chemical formula (14) or (15) at a chain end can be obtained by adjusting the molar ratio between the acid component and the diamine component to larger than one.

Useful reaction solvents include aprotic polar solvents such as N-methyl-2-pyrolidone, γ-butyrolactone, N,N-dimethyl formamide, N,N-dimethyl acetamide, and dimethyl sulfoxide; ethers such as tetrahydrofuran, dioxane, propylene glycol monomethyl ether, propylene glycol monoethyl ether, diethylene glycol monomethyl ether, diethylene glycol monoethyl ether diethylene glycol ethyl methyl ether, and diethylene glycol dimethyl ether; ketones such as acetone, methyl ethyl ketone, diisobutyl ketone, diacetone alcohol, and cyclohexanone; esters such as ethyl acetate, propylene glycol monomethyl ether acetate, and ethyl lactate; and aromatic hydrocarbons such as toluene, xylene, which may be used singly or in combination with one or more thereof. Furthermore, a solvent adopted to prepare the intended varnish may be used here to produce the varnish without isolating the resin after the production step.

Moreover, the carboxyl group in the polyamic acid used for the present invention may be esterified with a hydrocarbon group containing 1 to 10 carbon atoms or an alkylsilyl group containing 1 to 10 carbon atoms.

Compound (b), which is represented by chemical formula (1), can be derived from a multivalent amine compound or a diamine compound. Specifically, it can be obtained by reacting an amino group in a multivalent amine compound or diamine compound with a compound that gives a structure as chemical formula (2) through reaction with an amino group. Examples of such compounds that react with an amino group to form a structure as shown by chemical formula (1) include diketene, β-keto acid, β-thioketo acid, β-ketimino acid, α-sulfinyl carboxylic acid, α-sulfonyl carboxylic acid, α-phosphinoyl carboxylic acid, α-nitro carboxylic acid, α-cyano carboxylic acid, and derivatives thereof. More specifically, such compounds include diketene, acetoacetic acid, thioketene dimers, 1,2-benzo isoxazole-3-acetic acid, methane sulfinyl acetic acid, methane sulfonyl acetic acid, 2-(p-toluenesulfonyl)acetic acid, diphenyl phosphinoyl acetic acid, nitro acetic acid, and cyanoacetic acid. Of these, diketene, acetoacetic acid, 2-(p-toluenesulfonyl) acetic acid, and cyano acetic acid are preferable.

Next, a method for producing a varnish from the polyamic acid resin composition according to the present invention is explained below. For example, a varnish can be produced by dissolving polyamic acid (a) and compound (b), which is represented by chemical formula (1) in addition to solvent, along with a photoacid generating agent, dissolution adjusting agent, contact improving agent, inorganic particles, surface active agent, etc., as required. This dissolution can be carried out by stirring, heating, etc. If a photoacid generating agent is contained, an appropriate heating temperature is adopted in a range, commonly from room temperature to 80° C., where a photosensitive resin composition with unimpaired performance is obtained. There are no specific limitations on the order of dissolving these components, and for instance, the compound with the lowest solubility may be dissolved first followed by others in the order of solubility. Or, the dissolution of those components that are likely to form bubbles when dissolved by stirring, such as surface active agents and some contact improving agents, may be postponed to the other components so that the dissolution of the latter will not be hindered by bubble formation.

The resulting varnish is preferably filtrated through a filter to remove dust and particles. Filters with a pore size of, for example, 10 µm, 3 µm, 1 µm, 0.5 µm, 0.2 µm, 0.1 µm, 0.07 µm, or 0.05 µm are available, though there are no specific limitations on the size. The filter to be used for filtration may be of such a material as polypropylene (PP), polyethylene (PE), nylon (NY), and polytetrafluoroethylene (PTPE), of which polyethylene and nylon are preferable.

Next, a method for producing polyimide film using a varnish prepared from the polyamic acid resin composition according to the present invention is explained below.

First, a varnish is spread over a support. Useful supports include wafer substrates of silicon, gallium arsenide, or the like; glass substrates of sapphire glass, soda lime glass, alkali-free glass, or the like; metal substrates of stainless steel, copper, or the like, and others such as metal foil and ceramics substrate, of which use of a glass substrate is preferable. Useful varnish coating methods include spin coating, slit coating, dip coating, spray coating, and printing, which may be used in combination.

Before the coating step, the support may be pre-treated with a contact improving agent as described above. For example, a contact improving agent may be dissolved to 0.5 to 20 wt % in a solvent such as isopropanol, ethanol, methanol, water, tetrahydrofuran, propylene glycol monomethyl ether acetate, propylene glycol monomethyl ether, ethyl lactate, and diethyl adipate to prepare a solution, which is then used to treat the support surface by an appropriate technique such as spin coating, slit die coating, bar coating, dip coating, spray coating, and steam processing. Vacuum drying may be carried out as required, followed by heat treatment at 50° C. to 300° C. to accelerate the reaction between the support and the contact improving agent.

The coating step is commonly followed by drying the varnish coating film. Useful drying methods include reduced pressure drying methods, thermal drying methods, and combinations thereof. The reduced pressure drying methods include, for example, a process in which a support with a coating film formed on its surface is put in a vacuum chamber, followed by reducing the pressure in the vacuum chamber. Thermal drying is performed by using a tool such as hot plate, oven, and infrared ray. When using a hot plate, the coating film is put directly on the plate or held on jigs such as proxy pins fixed on the plate while being dried by heating.

There are various proxy pins of different materials including metals such as aluminum and stainless steel and synthetic resins such as polyimide resin and Teflon (registered trademark), but any types of proxy pins may work effectively if they have heat resistance. An appropriate proxy pin height may be adopted depending on the support size, type of the solvent used in the varnish, drying method used, etc., but it is preferably about 0.1 to 10 mm.

Depending on the type and purpose of the solvent used in the varnish, heating is performed preferably at a temperature in the range of room temperature to 180° C. for 1 minute to several hours.

When the polyamic acid resin composition according to the present invention contains a photoacid generating agent, a pattern can be formed by processing the dried coat film by the method described below. An actinic ray is applied to the coat film through a mask of an intended pattern. Actinic rays available for exposure include ultraviolet ray, visible light, electron beam, and X-ray, of which the i-line (365 nm), h-line (405 nm), and g-line (436 nm) of mercury lamp are preferred for the invention. If the film is positively photosensitive, the exposed parts are dissolved by a developer. If the film is negatively photosensitive, the exposed parts harden and become insoluble in a developer.

After the exposure step, a developer is used to remove the exposed parts of a positive film or unexposed parts of a negative film to form an intended pattern. Regardless of whether the film is positive or negative, preferable developers include an aqueous solution of alkaline compounds such as tetramethyl ammonium, diethanol amine, diethyl aminoethanol, sodium hydroxide, potassium hydroxide, sodium carbonate, potassium carbonate, trimethyl amine, diethyl amine, methyl amine, dimethyl amine, dimethylaminoethyl acetate, dimethyl aminoethanol, dimethylaminoethyl methacrylate, cyclohexyl amine, ethylene diamine, and hexamethylene diamine. In some cases, polar solvents such as N-methyl-2-pyrolidone, N,N-dimethyl formamide, N,N-dimethyl acetamide, dimethyl sulfoxide, γ-butyrolactone, and dimethyl acrylamide; alcohols such as methanol, ethanol and isopropanol; esters such as ethyl lactate and propylene glycol monomethyl ether acetate; and ketones such as cyclopentanone, cyclohexaone, isobutyl ketone, and methyl isobutyl ketone may be added singly or in combination to these aqueous alkali solution. For negative films, it is also possible to use such polar solvents as above that contain no aqueous alkali solution, or alcohols, esters, or ketones, which may be added singly or in combination. Commonly, rinsing in water is performed after the development step. Here again, the water used for rinsing may contain an alcohol such as ethanol and isopropyl alcohol, and an ester such as ethyl lactate and propylene glycol monomethyl ether acetate.

Finally, heat treatment is performed in the range of 180° C. or more and 600° C. or less to cure the coating film. The polyamic acid contained in the resin film that contains polyamic acid is imidized during this curing step to produce polyimide film. Such polyimide film produced through the imidization step can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

EXAMPLES

The present invention will be illustrated below in greater detail with reference to Examples, but it should be understood that the invention is not construed as being limited thereto. With respect to the number of measurements n, n=1 unless otherwise specified.

(1) Measurement of Viscosity

A varnish prepared was dissolved in N-methyl-2-pyrolidone to prepare a solution with a solid content of 10 mass % and measurement was performed at 25° C. using a viscometer (TVE-22H, manufactured by Toki Sangyo Co., Ltd.).

(2) Measurement of Weight Average Molecular Weight

The polystyrene-based weight average molecular weight was measured using a gel permeation chromatograph (Waters 2690, manufactured by Nihon Waters K. K.). TOSOH TXK-GEL α-2500 and α-4000 columns supplied by Tosoh Corporation were used along with a N-methyl-2-pyrolidone moving layer.

(3) Production of Polyimide Film

A varnish was subjected to filtration under pressure using a 1 µm filter to remove foreign objects. Using a coater-developer apparatus Mark-7 (manufactured by Tokyo Electron Ltd.), spin coating was performed on a 6-inch silicon wafer in such a way that the film thickness after pre-baking for 4 minutes at 140° C. would be 15 μm and then such pre-baking was carried out. The pre-baked film was heat-treated at 350° C. for 30 minutes in a nitrogen air flow (oxygen concentration 20 ppm or less) in an inert gas oven (INH-21CD, manufactured by Koyo Thermo Systems Co., Ltd.) to produce polyimide film. Subsequently, the polyimide film was separated from the silicon wafer substrate by immersion in hydrofluoric acid for 4 minutes and then it was air-dried. The polyimide film thus obtained was used for measurement in paragraphs (4) to (7).

(4) Measurement of Ultimate Tensile Elongation, Ultimate Tensile Stress, Young's Modulus Measurements were made using a Tensilon universal testing machine (RTM-100, manufactured by Orientec Co., Ltd.) according to Japanese Industrial Standard (JIS K 7127: 1999).

Measuring conditions were as follows: width of test piece 10 mm, chuck interval 50 mm, test speed 50 mm/min, number of measurements n=10.

(5) Measurement of Glass Transition Temperature (Tg)

Measurements were made in a nitrogen air flow using a thermomechanical analysis apparatus (EXSTAR6000 TMA/SS6100, manufactured by SII NanoTechnology Inc.) Heating was performed under the following conditions. A specimen was heated up to 200° C. in the first stage to remove adsorbed water and cooled to room temperature in the second stage. In the third stage, measurements were made at a heating rate of 5° C./min to determine the glass transition temperature.

(6) Measurement of Coefficient of Thermal Expansion (CTE)

Measurements were made using the same apparatus and under the same conditions as used for the measurement of glass transition temperature to determine the average coefficient of linear expansion in the range of 50 to 200° C.

(7) Measurement of 5% Mass Decrease Temperature (Td5)

A thermal mass measuring apparatus (TGA-50, manufactured by Shimadzu Corporation) was used to make measurements in a nitrogen air flow. Heating was performed under the following conditions. A specimen was heated up to 150° C. in the first stage to remove adsorbed water and cooled to room temperature in the second stage. In the third stage, measurements were made at a heating rate of 10° C./min to determine the 5% mass decrease temperature.

(8) Measurement of $^1$H-NMR

A magnetic nuclear resonance apparatus (EX-270, manufactured by JEOL Ltd.) was used along with deuterated dimethyl sulfoxide as deuterated solvent to measure the $^1$H-NMR spectrum Listed below are abbreviations of the compounds used in Synthesis examples, Polymerization examples, Examples, and Comparative examples.
CHDA: trans-1,4-cyclohexane diamine
DAE: 4,4'-diaminodiphenyl ether
p-PDA: p-phenylene diamine
m-PDA: m-phenylene diamine
TAM: tris(4-aminophenyl)methane
TAB: 1,3,5-tris(4-aminophenoxy)benzene
BPDA: 3,3',4,4'-biphenyl tetracarboxylic dianhydride
ODPA: bis(3,4-dicarboxyphenyl)ether dianhydride
PMDA: pyromellitic dianhydride
DIBOC: di-tert-butyl dicarbonate
DMAP: N,N-dimethyl-4-aminopyridine
CPME: cyclopentyl methyl ether NMP: N-methyl-2-pyrolidone
THF: tetrahydrofuran Synthesis Example 1: Compound A A thermometer and a stirring rod equipped with stirring blades were fitted on a 300 mL four-necked flask. Then, 100 g of THF was added under a dry nitrogen flow and stirred at room temperature. Then, 10.00 g (49.94 mmol) of DAE and 61.01 mg (499.4 μmol) of DMAP were added and washing was performed with 10 g of THF. After cooling to 10° C. or below, 8.607 g (102.4 mmol) of diketene diluted with 10 g of THF was dropped. After finishing the dropping, the temperature was raised to 30° C. and stirring was performed for 1 hour. After the cooling, the deposit was recovered by filtration. It was dried to provide compound A as represented by chemical formula (A). The yield was 12.03 g (percent yield 65%).

[Chemical formula 22]

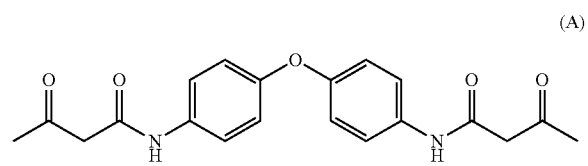

(A)

Synthesis Example 2: Compound B

A thermometer and a stirring rod equipped with stirring blades were fitted on a 300 mL four-necked flask. Then, 100 g of THF was added under a dry nitrogen flow and stirred at room temperature. Then, 10.00 g (92.47 mmol) of p-PDA and 113.0 mg (924.7 μmol) of DMAP were added and washing was performed with 10 g of THF. After cooling to 10° C. or below, 15.94 g (189.6 mmol) of diketene diluted with 10 g of THF was dropped. After finishing the dropping, the temperature was raised to 30° C. and stirring was performed for 1 hour. After the cooling, the deposit was recovered by filtration. Recrystallization was performed with ethanol, followed by drying to provide compound B as represented by chemical formula (B) given below. The yield was 19.99 g (percent yield 78%).

[Chemical formula 23]

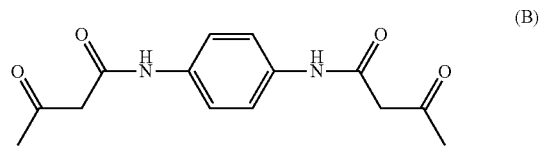

(B)

Synthesis Example 3: Compound C

A thermometer and a stirring rod equipped with stirring blades were fitted on a 300 mL four-necked flask. Then, 100 g of CPME was added under a dry nitrogen flow and stirred at room temperature. Then, 10.00 g (92.47 mmol) of m-PDA and 113.0 mg (924.7 μmol) of DMAP were added and washing was performed with 10 g of CPME. After cooling to 10° C. or below, 15.94 g (189.6 mmol) of diketene diluted with 10 g of CPME was dropped. After finishing the dropping, the temperature was raised to 30° C. and stirring was performed for 1 hour. After the cooling, the deposit was recovered by filtration. Recrystallization was performed with ethanol, followed by drying to provide compound C as represented by chemical formula (C) given below. The yield was 14.48 g (percent yield 57%).

[Chemical formula 24]

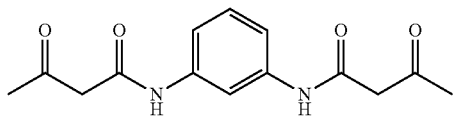

(C)

Synthesis Example 4: Compound D

A thermometer and a stirring rod equipped with stirring blades were fitted on a 300 mL four-necked flask. Then, 100 g of CPME was added under a dry nitrogen flow and stirred at room temperature. Then, 10.00 g (87.57 mmol) of CHDA was added and washing was performed with 10 g of CPME. After cooling to 10° C. or below, 15.09 g (179.5 mmol) of diketene diluted with 10 g of CPME was dropped. After finishing the dropping, the temperature was raised to 30° C. and stirring was performed for 1 hour. After the cooling, the deposit was recovered by filtration. Recrystallization was performed with ethanol, followed by drying to provide compound D as represented by chemical formula (D) given below. The yield was 16.24 g (yield 66%).

[Chemical formula 25]

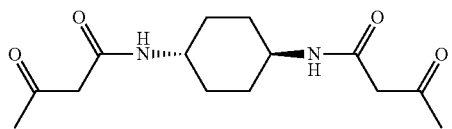

(D)

Synthesis Example 5: Compound E

A thermometer and a stirring rod equipped with stirring blades were fitted on a 300 mL four-necked flask. Then, 80 g of THF was added under a dry nitrogen flow and stirred at room temperature. Then, 10.00 g (34.56 mmol) of TAM and 63.33 mg (518.4 µmol) of DMAP were added and washing was performed with 10 g of THF. After cooling to 10° C. or below, 9.152 g (108.9 mmol) of diketene diluted with 10 g of THF was dropped. After finishing the dropping, the temperature was raised to 30° C. and stirring was performed for 1 hour. After the cooling, the deposit was recovered by filtration. It was dried to provide compound E as represented by chemical formula (E). The yield was 16.66 g (yield 89%).

[Chemical formula 26]

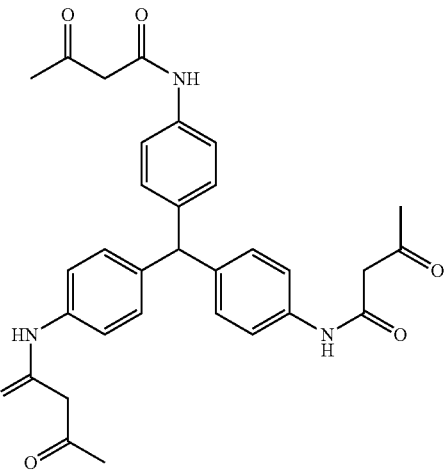

(E)

Synthesis Example 6: Compound F

A thermometer and a stirring rod equipped with stirring blades were fitted on a 300 mL four-necked flask. Then, 80 g of NMP was added under a dry nitrogen flow and stirring was performed at room temperature. Then, 10.00 g (25.04 mmol) of TAB was added and washing was performed with 10 g of NMP. After cooling to 10° C. or below, 6.31 g (75.11 mmol) of diketene diluted with 10 g of NMP was dropped. After finishing the dropping, the temperature was raised to 40° C. and stirring was performed for 1 hour. After the cooling, the reaction solution was used as NMP solution of compound F as represented by chemical formula (F).

[Chemical formula 27]

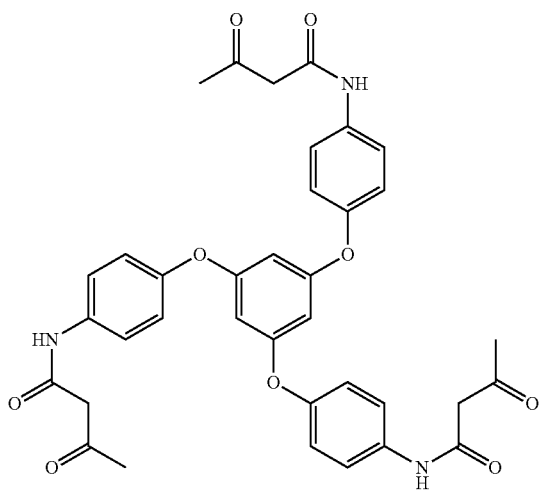

(F)

Synthesis Example 7: Compound G

A thermometer and a stirring rod equipped with stirring blades were fitted on a 300 mL four-necked flask. Then, 130 g of NMP was added under a dry nitrogen flow and stirring was performed at room temperature. Then, 10.00 g (79.29 mmol) of melamine was added and washing was performed with 10 g of NMP. After cooling to 10° C. or below, 20.00 g (237.9 mmol) of diketene diluted with 10 g of NMP was dropped. After finishing the dropping, the temperature was raised to 60° C. and stirring was performed for 2 hours. After the cooling, the reaction solution was used as NMP solution of compound G as represented by chemical formula (G).

[Chemical formula 28]

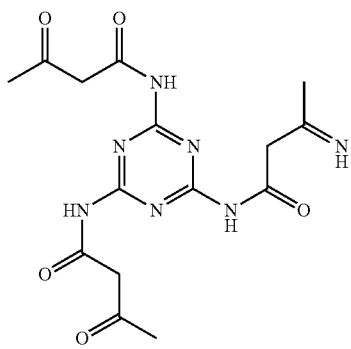

(G)

[Chemical formula 29]

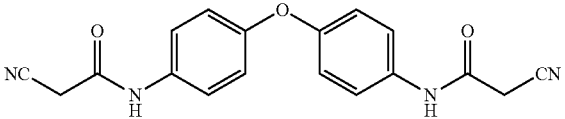

(H)

Synthesis Example 9: Compound I

A thermometer and a stirring rod equipped with stirring blades were fitted on a 300 mL four-necked flask. Then, 70 g of NMP was added under a dry nitrogen flow. Subsequently, while stirring was performed at room temperature, 21.40 g (99.88 mmol) of 2-(p-toluenesulfonyl)acetic acid was added and washing was performed with 10 g of NMP. After confirming the dissolution of cyanoacetic acid, the solution was cooled to 10° C. or below. After the cooling, 16.60 g (102.4 mmol) of carbonyl diimidazole was added and washing was performed with 10 g of NMP. After the addition, stirring was continued overnight at room temperature. On the next day, 10.00 g (49.94 mmol) of DAE was added and washing was performed with 10 g of NMP. After the addition, stirring was additionally continued overnight at room temperature. The reaction solution was used as NMP solution of compound I as represented by chemical formula (I).

[Chemical formula 30]

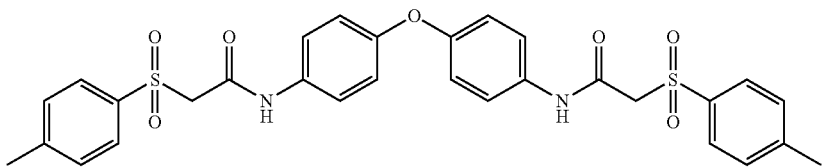

(I)

Synthesis Example 8: Compound H

A thermometer and a stirring rod equipped with stirring blades were fitted on a 300 mL four-necked flask. Then, 70 g of NMP was added under a dry nitrogen flow. Subsequently, while stirring was performed at room temperature, 8.496 g (99.88 mmol) of cyanoacetic acid was added and washing was performed with 10 g of NMP. After confirming the dissolution of cyanoacetic acid, the solution was cooled to 10° C. or below. After the cooling, 16.60 g (102.4 mmol) of carbonyl diimidazole was added and washing was performed with 10 g of NMP. After the addition, stirring was continued overnight at room temperature. On the next day, 10.00 g (49.94 mmol) of DAE was added and washing was performed with 10 g of NMP. After the addition, stirring was additionally continued overnight at room temperature. The reaction solution was used as NMP solution of compound H as represented by chemical formula (H).

Synthesis Example 10: Compound J

A thermometer and a stirring rod equipped with stirring blades were fitted on a 300 mL four-necked flask. Then, 100 g of THF was added under a dry nitrogen flow and stirred at room temperature. Then, 10.00 g (49.94 mmol) of DAE, 11.12 g (109.9 mmol) of triethyl amine, and 61.01 mg (49.94 µmol) of DMAP were added and washing was performed with 10 g of THF. After cooling to 10° C. or below, 10.71 g (104.9 mmol) of acetic anhydride diluted with 10 g of THF was dropped. After finishing the dropping, the temperature was raised to 40° C. and stirring was performed for 1 hour. After the cooling, the deposit was recovered by filtration. It was dried to provide compound J as represented by chemical formula (J). The yield was 9.120 g (yield 55%).

[Chemical formula 31]

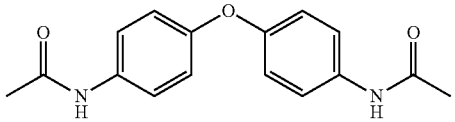

(J)

Synthesis Example 11: Compound K

A thermometer and a stirring rod equipped with stirring blades were fitted on a 300 mL four-necked flask. Then, 100 g of THF was added under a dry nitrogen flow and stirred at room temperature. Then, 10.00 g (87.57 mmol) of CHDA was added and washing was performed with 10 g of THF. After cooling to 10° C. or below, 39.18 g (179.5 mmol) of DIBOC diluted with 10 g of THF was dropped. After the addition, the solution was heated to room temperature. After one week, the deposit was recovered by filtration. It was dried to provide compound K as represented by chemical formula (K). The yield was 17.90 g (yield 90%).

[Chemical formula 32]

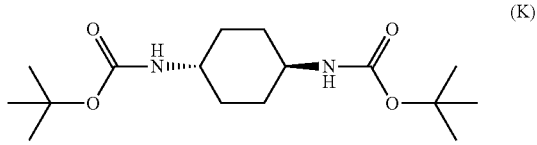

(K)

Polymerization Example 1: Resin a (Examples 1 to 3 and 5 to 8 and Comparative Examples 2 and 3)

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 11.41 g (57.00 mmol) of DAE was added and washing was performed with 10 g of NMP. After confirming the dissolution of DAE, 13.09 g (60.00 mmol) of PMDA was added and washing was performed with 10 g of NMP. After 2 hours, the solution was cooled.

Polymerization Example 2: Resin b (Comparative Example 1)

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is performed at room temperature, 6.007 g (30.00 mmol) of DAE was added and washing was performed with 10 g of NMP. After confirming the dissolution of DAE, 6.544 g (30.00 mmol) of PMDA was added and washing was performed with 10 g of NMP. After 2 hours, the solution was cooled.

Polymerization Example 3: Resin c (Example 4 and Comparative Example 4)

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is performed at room temperature, 11.41 g (57.00 mmol) of DAE was added and washing was performed with 10 g of NMP. After confirming the dissolution of DAE, 13.09 g (60.00 mmol) of PMDA was added and washing was performed with 10 g of NMP. After 2 hours, 1-hexanol (6.000 mmol) was added and washing was performed with 5 g of NMP. After 1 hour, the solution was cooled.

Polymerization Example 4: Resin d (Examples 9 and 10 and Comparative Example 8)

A thermometer and a stirring rod equipped with stirring blades were fitted on a 200 mL four-necked flask. Then, 100 g of NMP was added under a dry nitrogen flow, and the temperature was elevated to 60° C. After the temperature elevation, while stirring is performed at room temperature, 6.164 g (57.00 mmol) of p-PDA was added and washing was performed with 10 g of NMP. After confirming the dissolution of p-PDA, 17.65 g (60.00 mmol) of BPDA was added and washing was performed with 10 g of NMP. After 4 hours, the solution was cooled.

Polymerization Example 5: Resin e (Comparative Example 7)

A thermometer and a stirring rod equipped with stirring blades were fitted on a 200 mL four-necked flask. Then, 85 g of NMP was added under a dry nitrogen flow, and the temperature was elevated to 60° C. After the temperature elevation, while stirring is performed at room temperature, 3.244 g (30.00 mmol) of p-PDA was added and washing was performed with 10 g of NMP. After confirming the dissolution of p-PDA, 8.827 g (30.00 mmol) of BPDA was added and washing was performed with 10 g of NMP. After a period of time, the viscosity of the polymerization solution increased, making it impossible to continue stirring any longer.

Polymerization Example 6: Resin f (Example 11 and Comparative Examples 10 and 11)

A thermometer and a stirring rod equipped with stirring blades were fitted on a 200 mL four-necked flask. Then, 75 g of NMP was added under a dry nitrogen flow, and the temperature was elevated to 60° C. After the temperature elevation, while stirring is continued at room temperature, 5.424 g (47.50 mmol) of CHDA was added and washing was performed with 10 g of NMP. After confirming the dissolution of CHDA, 10.30 g (35.00 mmol) of BPDA and 4.653 g (15.00 mmol) of ODPA were added and washing was performed with 10 g of NMP. After 4 hours, the solution was cooled.

Polymerization Example 7: Resin g (Comparative Example 5)

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 11.41 g (57.00 mmol) of DAE and 868.1 g (2.000 mmol) of TAM were added and washing was performed with 10 g of NMP. After confirming the dissolution of DAE and TAM, 13.09 g (60.00 mmol) of PMDA was added and washing was performed with 10 g of NMP. After a period of time, the polymerization solution gelated, making it impossible to continue stirring any longer.

Polymerization Example 8: Resin h (Comparative Example 6)

A thermometer and a stirring rod equipped with stirring blades were fitted on a 200 mL four-necked flask. Then, 85 g of NMP was added under a dry nitrogen flow, and the temperature was elevated to 40° C. After the temperature elevation, while stirring is continued at room temperature, 11.41 g (57.00 mmol) of DAE and 1.198 g (2.000 mmol) of TAB were added and washing was performed with 10 g of NMP. After confirming the dissolution of DAE and TAB, 13.09 g (60.00 mmol) of PMDA was added and washing was performed with 10 g of NMP. After a period of time, the polymerization solution gelated, making it impossible to continue stirring any longer.

Polymerization Example 9: Resin i (Comparative Example 9)

A thermometer and a stirring rod equipped with stirring blades were fitted on a 200 mL four-necked flask. Then, 100 g of NMP was added under a dry nitrogen flow, and the temperature was elevated to 60° C. After the temperature elevation, while stirring is performed at room temperature, 6.164 g (57.00 mmol) of p-PDA and 378.4 mg (2.000 mmol) of melamine was added and washing was performed with 10 g of NMP. Subsequently, 17.65 g (60.00 mmol) of BPDA was added and washing was performed with 10 g of NMP. After 4 hours, the solution was cooled, but melamine was found precipitated without undergoing reaction.

(Examples 1 to 11) and (Comparative Examples 1 to 11)

Compounds A to K obtained in Synthesis examples 1 to 11 and solutions of resins a to i obtained in Polymerization examples 1 to 9 were used to prepare varnish specimens with the molar ratios given in Tables 1 and 2.

Tables 1 and 2 show results of evaluation of the varnish specimens prepared in Examples 1 to 11 and Comparative examples 1 to 11 and measurements of the ultimate tensile elongation, ultimate tensile stress, Young's modulus, coefficient of thermal expansion, glass transition temperature, and 5% thermal mass decrease temperature of the polyimide films produced from the varnish specimens.

TABLE 1

| | Example | | | 1 | 2 | 3 | 4 | 5 | 6 | 7 | 8 | 9 | 10 | 11 |
|---|---|---|---|---|---|---|---|---|---|---|---|---|---|---|
| molar ratio | resin | acid dianhydride | PMDA | 100 | 100 | 100 | 100 | 100 | 100 | 100 | 100 | | | |
| | | | BPDA | | | | | | | | | 100 | 100 | 70 |
| | | | ODPA | | | | | | | | | | | 30 |
| | | diamine compound | DAE | 95 | 95 | 95 | 95 | 95 | 95 | 95 | 95 | | | |
| | | | p-PDA | | | | | | | | | 95 | 95 | |
| | | | CHDA | | | | | | | | | | | 95 |
| | | end capping agent | 1-hexanol | | | | 10 | | | | | | | |
| | additive | compound A | | 5 | | | 5 | | | | | | | |
| | | compound B | | | 5 | | | | | | | 5 | | |
| | | compound C | | | | 5 | | | | | | | | |
| | | compound D | | | | | | | | | | | | 5 |
| | | compound E | | | | | | | | 3.33 | | | | |
| | | compound F | | | | | | | 3.33 | | | | | |
| | | compound G | | | | | | | | | | | 3.33 | |
| | | compound H | | | | | | | | | 5 | | | |
| | | compound I | | | | | | | | | | 5 | | |
| evaluation item | | | unit | | | | | | | | | | | |
| weight average molecular weight of resin | | | | 69900 | 69900 | 69900 | 82000 | 69900 | 69900 | 69900 | 69900 | 26000 | 26000 | 29200 |
| viscosity of varnish (10 mass % NMP) | | | cP | 585 | 672 | 449 | 823 | 545 | 511 | 578 | 554 | 105 | 84 | 55 |
| ultimate tensile elongation | | | MPa | 93 | 106 | 96 | 94 | 76 | 72 | 101 | 98 | 16 | 28 | 12 |
| ultimate tensile stress | | | % | 238 | 232 | 200 | 211 | 205 | 192 | 233 | 229 | 293 | 255 | 209 |
| Young's modulus | | | GPa | 1.5 | 2.0 | 2.0 | 2.0 | 1.7 | 2.4 | 1.6 | 1.5 | 7.3 | 7.1 | 5.1 |
| coefficient of thermal expansion | | | ppm/° C. | 36 | 37 | 37 | 36 | 35 | 34 | 37 | 36 | 7.5 | 10.3 | 26 |
| glass transition temperature | | | ° C. | 371 | 367 | 368 | 362 | 365 | 364 | 370 | 368 | 358 | 355 | 259 |
| 5% heat mass decrease temperature | | | ° C. | 580 | 580 | 578 | 578 | 572 | 579 | 580 | 579 | >600 | >600 | 500 |

TABLE 2

| | Comparative example | | | 1 | 2 | 3 | 4 | 5 | 6 | 7 | 8 | 9 | 10 | 11 |
|---|---|---|---|---|---|---|---|---|---|---|---|---|---|---|
| molar ratio | resin | acid dianhydride | PMDA | 100 | 100 | 100 | 100 | 100 | 100 | | | | | |
| | | | BPDA | | | | | | | 100 | 100 | 100 | 70 | 70 |
| | | | ODPA | | | | | | | | | | 30 | 30 |
| | | diamine compound | DAE | 100 | 95 | 95 | 95 | 95 | 95 | | | | | |
| | | | p-PDA | | | | | | | 100 | 95 | 95 | | |
| | | | CHDA | | | | | | | | | | 95 | 95 |
| | | | TAM | | | | | 3.33 | | | | | | |
| | | | TAB | | | | | | 3.33 | | | | | |
| | | | melamine | | | | | | | | | 3.33 | | |
| | | end capping agent | 1-hexanol | | | | 10 | | | | | | | |
| | additive | compound J | | | | | 5 | | | | | | | |
| | | compound K | | | | | | | | | | | | 5 |
| evaluation item | | | unit | | | | | | | | | | | |
| weight average molecular weight of resin | | | | 89600 | 69900 | 69900 | 82000 | N.D.*1 | N.D.*1 | 102600 | 26000 | N.D.*3 | 29200 | 29200 |
| viscosity of varnish (10 mass % NMP) | | | cP | 2819 | 844 | 529 | 1038 | N.D.*1 | N.D.*1 | >40000 | 122 | N.D.*3 | 62 | N.D.*5 |
| ultimate tensile elongation | | | % | 101 | 52 | 60 | 79 | N.D.*1 | N.D.*1 | N.D.*2 | 8 | N.D.*3 | N.D.*4 | N.D.*5 |
| ultimate tensile stress | | | MPa | 228 | 128 | 135 | 141 | N.D.*1 | N.D.*1 | N.D.*2 | 230 | N.D.*3 | N.D.*4 | N.D.*5 |
| Young's modulus | | | GPa | 1.6 | 2.0 | 2.6 | 2.0 | N.D.*1 | N.D.*1 | N.D.*2 | 6.8 | N.D.*3 | N.D.*4 | N.D.*5 |

TABLE 2-continued

| Comparative example | | 1 | 2 | 3 | 4 | 5 | 6 | 7 | 8 | 9 | 10 | 11 |
|---|---|---|---|---|---|---|---|---|---|---|---|---|
| coefficient of thermal expansion | ppm/° C. | 32 | 35 | 36 | 34 | N.D.*1 | N.D.*1 | N.D.*2 | 6.3 | N.D.*3 | N.D.*4 | N.D.*5 |
| glass transition temperature | ° C. | 372 | 366 | 369 | 366 | N.D.*1 | N.D.*1 | N.D.*2 | 364 | N.D.*3 | N.D.*4 | N.D.*5 |
| 5% heat mass decrease temperature | ° C. | 590 | 589 | 598 | 587 | N.D.*1 | N.D.*1 | N.D.*2 | >600 | N.D.*3 | N.D.*4 | N.D.*5 |

*1: No Data (Gelation occurred during polymerization.)
*2: No Data (Varnish viscosity was too high to use for coating.)
*3: No Data (Melamine did not dissolve.)
*4: No Data (Cured film was so brittle that it was broken when removed from the substrate.)
*5: No Data (Compound F did not dissolve and it was impssoibe to prepare a varnish.)

Example 12

A varnish specimen with a viscosity of about 2,000 cP (actually a viscosity of 1970 cP) was prepared from resin a and compound A at the same ratio as adopted in Example 1. After storage at 23° C. for 1 week, the varnish had a viscosity of 1940 cP.

Comparative Example 12

Except for using DAE instead of compound A, the same procedure as in Example 12 was carried out to prepare a varnish with a viscosity of about 2,000 cP (actually with a viscosity of 2010 cP). After storage at 23° C. for 1 week, the varnish had a largely increased viscosity of 2920 cP.

Example 13

A varnish with a solid content of 15% prepared from resin a and compound A at the molar ratio adopted in Example 1 was spread over a glass substrate with a thickness of 0.7 mm by slit coating to form a liquid film with a thickness of 200 μm. It was dried at 140° C. for 10 minutes, and a glass substrate with a 30 μm coat film was obtained after the drying step.

Subsequently, this glass substrate was heated in nitrogen at 350° C. for 30 minutes to provide a glass substrate coated with polyimide film with a film thickness of 20 μm.

INDUSTRIAL APPLICABILITY

The present invention serves to produce polyamic acid resin composition that can form a low-viscosity solution. After being cured, the coat film shows good physical properties and can be used favorably as material for surface protect film and interlayer insulation film of semiconductor elements, insulation layers and spacer layers of organic electroluminescent elements (organic EL elements), planarizing film of thin film transistor substrates, insulation layers of organic transistors, flexible printed boards, substrates for flexible display, substrates for flexible electronic paper, substrates for flexible solar batteries, substrates for flexible color filters, binders for electrodes of lithium ion secondary batteries, and adhesives for semiconductors.

The invention claimed is:

1. A polyamic acid resin composition comprising (a) polyamic acid and (b) a compound as represented by chemical formula (1):

$$Z\text{-}(V)_k \quad (1)$$

wherein Z is a divalent or higher valent organic group containing 2 or more carbon atoms, V is a structure as represented by chemical formula (2) below, and k is an integer of 2 or more,

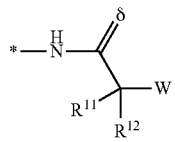

(2)

wherein δ represents oxygen or sulfur atom, W represents an electron-withdrawing group, and $R^{11}$ and $R^{12}$ represent independently a hydrogen atom or a hydrocarbon group containing 1 to 10 carbon atoms.

2. The polyamic acid resin composition as described in claim 1, wherein W in chemical formula (2) is represented by any one of chemical formulae (3) to (10):

(3)

(4)

(5)

(6)

(7)

(8)

(9)

(10)

wherein $R^{21}$ to $R^{28}$ are independently a hydrocarbon group containing 1 to 10 carbon atoms or an organic group containing 1 to 10 carbon atoms and comprising hydrogen and carbon as essential elements and 1 to 10 other atoms of elements selected from the group of boron, oxygen, sulfur, nitrogen, phosphorus, silicon, and halogens.

3. The polyamic acid resin composition as described in claim 1, wherein V in chemical formula (1) is represented by any one of chemical formulae (11) to (13):

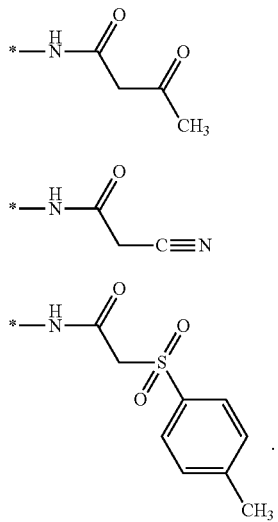

4. The polyamic acid resin composition as described in claim 1, wherein k in chemical formula (1) is an integer of 2 or 3.

5. The polyamic acid resin composition as described in claim 1, wherein polyamic acid (a) contains a structure as represented by chemical formula (14) or (15):

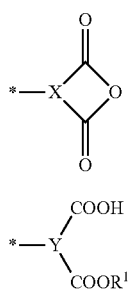

wherein X in Chemical formula (14) denotes a trivalent or higher valent organic group containing 2 or more carbon atoms; Y in chemical formula (15) denotes a trivalent or higher valent organic group containing 2 or more carbon atoms; and $R^1$ denotes a hydrogen atom, a hydrocarbon group containing 1 to 10 carbon atoms, or an alkylsilyl group containing 1 to 10 carbon atoms.

6. A polyimide film comprising polyimide as produced by imidizing the polyamic acid resin composition as described in claim 1.

7. A production method for polyimide film comprising a step for imidizing the polyamic acid resin composition as described in claim 1.

8. A coated glass substrate produced by coating a glass substrate with a varnish containing the polyamic acid resin composition as described in claim 1 and removing the solvent by drying.

9. A glass substrate coated with polyimide film produced by heating the coated glass substrate as described in claim 8 at a temperature of 180° C. to 600° C.

10. A production method for a glass substrate coated with polyimide film comprising a step for imidizing, by heating, the coated glass substrate as described in claim 8.

11. The polyamic acid resin composition as described in claim 2, wherein V in chemical formula (1) is represented by any one of chemical formulae (11) to (13):

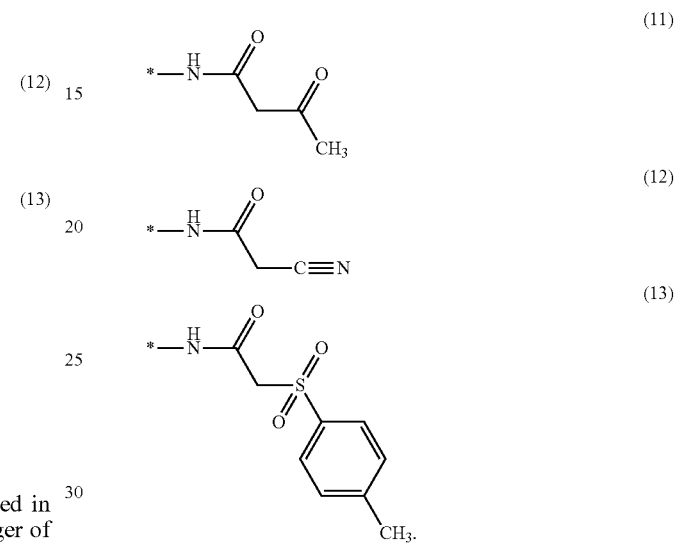

12. The polyamic acid resin composition as described in claim 2, wherein k in chemical formula (1) is an integer of 2 or 3.

13. The polyamic acid resin composition as described in claim 3, wherein k in chemical formula (1) is an integer of 2 or 3.

14. The polyamic acid resin composition as described in claim 2, wherein polyamic acid (a) contains a structure as represented by chemical formula (14) or (15):

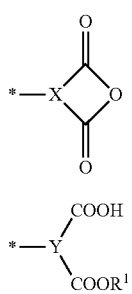

wherein X in Chemical formula (14) denotes a trivalent or higher valent organic group containing 2 or more carbon atoms; Y in chemical formula (15) denotes a trivalent or higher valent organic group containing 2 or more carbon atoms; and $R^1$ denotes a hydrogen atom, a hydrocarbon group containing 1 to 10 carbon atoms, or an alkylsilyl group containing 1 to 10 carbon atoms.

15. The polyamic acid resin composition as described in claim 3, wherein polyamic acid (a) contains a structure as represented by chemical formula (14) or (15):

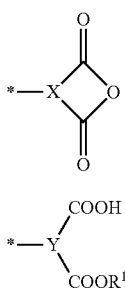

(14)

(15)

wherein X in Chemical formula (14) denotes a trivalent or higher valent organic group containing 2 or more carbon atoms; Y in chemical formula (15) denotes a trivalent or higher valent organic group containing 2 or more carbon atoms; and R¹ denotes a hydrogen atom, a hydrocarbon group containing 1 to 10 carbon atoms, or an alkylsilyl group containing 1 to 10 carbon atoms.

16. The polyamic acid resin composition as described in claim 4, wherein polyamic acid (a) contains a structure as represented by chemical formula (14) or (15):

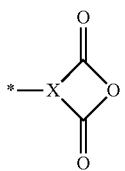

(14)

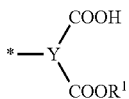

(15)

wherein X in Chemical formula (14) denotes a trivalent or higher valent organic group containing 2 or more carbon atoms; Y in chemical formula (15) denotes a trivalent or higher valent organic group containing 2 or more carbon atoms; and R¹ denotes a hydrogen atom, a hydrocarbon group containing 1 to 10 carbon atoms, or an alkylsilyl group containing 1 to 10 carbon atoms.

17. A polyimide film comprising polyimide as produced by imidizing the polyamic acid resin composition as described in claim 2.

18. A polyimide film comprising polyimide as produced by imidizing the polyamic acid resin composition as described in claim 3.

19. A polyimide film comprising polyimide as produced by imidizing the polyamic acid resin composition as described in claim 4.

20. A polyimide film comprising polyimide as produced by imidizing the polyamic acid resin composition as described in claim 5.

\* \* \* \* \*